(12) United States Patent
Allard

(10) Patent No.: US 8,911,626 B2
(45) Date of Patent: Dec. 16, 2014

(54) BIORETENTION SYSTEM WITH INTERNAL HIGH FLOW BYPASS

(75) Inventor: Douglas Paul Allard, Occidental, CA (US)

(73) Assignee: Oldcastle Precast, Inc., Atlanta, GA (US)

( * ) Notice: Subject to any disclaimer, the term of this patent is extended or adjusted under 35 U.S.C. 154(b) by 566 days.

(21) Appl. No.: 13/214,230

(22) Filed: Aug. 21, 2011

(65) Prior Publication Data

US 2012/0152827 A1 Jun. 21, 2012

Related U.S. Application Data

(63) Continuation-in-part of application No. 12/977,015, filed on Dec. 22, 2010, now Pat. No. 8,535,533.

(60) Provisional application No. 61/289,376, filed on Dec. 22, 2009.

(51) Int. Cl.
*C02F 3/32* (2006.01)
*E03F 5/10* (2006.01)
*E03F 5/04* (2006.01)
*C02F 103/00* (2006.01)

(52) U.S. Cl.
CPC ............. *C02F 3/327* (2013.01); *C02F 2303/24* (2013.01); *E03F 5/101* (2013.01); *E03F 5/0404* (2013.01); *C02F 2103/001* (2013.01)
USPC ........ 210/602; 210/631; 210/747.3; 210/151; 210/170.03; 210/170.08; 210/254

(58) Field of Classification Search
CPC .............. C02F 3/327; C02F 2103/001; C02F 2303/24; E03F 5/0404; E03F 5/101; E03F 5/14; E03F 5/16
USPC ........... 210/602, 617, 631, 747.2, 747.3, 150, 210/151, 162, 163, 164, 170.03, 170.08, 210/254
See application file for complete search history.

(56) References Cited

U.S. PATENT DOCUMENTS

| | | | |
|---|---|---|---|
| 4,537,687 A | 8/1985 | Piper | |
| 4,682,907 A * | 7/1987 | Gaudin | ........................ 210/164 |
| 5,322,629 A | 6/1994 | Stewart | |
| 5,437,786 A | 8/1995 | Horsley | |
| 5,549,817 A | 8/1996 | Horsley | |
| 5,569,387 A | 10/1996 | Bowne | |
| 5,624,576 A | 4/1997 | Lenhart et al. | |

(Continued)

FOREIGN PATENT DOCUMENTS

WO    WO 2010/118110 A9    10/2010

OTHER PUBLICATIONS

Office Action mailed Dec. 27, 2012 in co-pending U.S. Appl. No. 12/977,015.

(Continued)

*Primary Examiner* — Christopher Upton

(57) ABSTRACT

The invention provides a bioretention system comprising one or more chambers and a high flow bypass system with top and bottom weirs for water filtration and storm water flow management. The invention also provides methods that are useful for managing storm water flow and inhibiting the flow of pollutants, debris, and other contaminants into drainage systems.

55 Claims, 28 Drawing Sheets

(56) References Cited

U.S. PATENT DOCUMENTS

| | | |
|---|---|---|
| 5,702,593 A | 12/1997 | Horsley |
| 5,707,527 A | 1/1998 | Knutson et al. |
| 5,728,305 A | 3/1998 | Hawkinson |
| 5,744,048 A | 4/1998 | Stetler |
| 5,759,415 A | 6/1998 | Adams |
| 5,788,848 A | 8/1998 | Blanche et al. |
| 5,855,775 A | 1/1999 | Kerfoot |
| 5,985,157 A | 11/1999 | Leckner et al. |
| 6,027,639 A | 2/2000 | Lenhart, Jr. et al. |
| 6,132,603 A | 10/2000 | Mokrzycki |
| 6,277,274 B1 | 8/2001 | Coffman |
| 6,350,374 B1 | 2/2002 | Stever et al. |
| 6,383,373 B1 | 5/2002 | Nakao et al. |
| 6,406,218 B1 | 6/2002 | Olson |
| 6,511,595 B2 | 1/2003 | Crompton et al. |
| 6,531,059 B1 | 3/2003 | Morris et al. |
| 6,569,321 B2 | 5/2003 | Coffman |
| 6,641,720 B1 | 11/2003 | Crompton et al. |
| 6,649,048 B2 | 11/2003 | de Ridder et al. |
| 6,676,832 B2 | 1/2004 | de Bruijn |
| 6,783,683 B2 | 8/2004 | Collings |
| 6,905,599 B2 | 6/2005 | Allard |
| 6,991,114 B2 | 1/2006 | Allen, II et al. |
| 6,991,402 B2 | 1/2006 | Burkhart |
| 6,991,734 B1 * | 1/2006 | Smith et al. ............... 210/747.3 |
| 6,998,038 B2 | 2/2006 | Howard |
| 7,022,243 B2 | 4/2006 | Bryant |
| 7,160,058 B2 | 1/2007 | Burkhart |
| 7,186,058 B2 | 3/2007 | Schluter et al. |
| 7,186,333 B2 | 3/2007 | Kluge |
| 7,237,981 B1 | 7/2007 | Vitarelli |
| 7,294,256 B2 | 11/2007 | Happel et al. |
| 7,296,692 B2 | 11/2007 | Allen, II et al. |
| 7,297,266 B2 | 11/2007 | Cobb et al. |
| 7,344,335 B2 | 3/2008 | Burkhart |
| 7,425,261 B2 | 9/2008 | Siviter et al. |
| 7,425,262 B1 | 9/2008 | Kent |
| 7,470,362 B2 | 12/2008 | Kent |
| 7,625,485 B2 | 12/2009 | Siviter et al. |
| 7,638,065 B2 | 12/2009 | Stever |
| 7,674,378 B2 | 3/2010 | Kent |
| 7,776,217 B2 | 8/2010 | Lucas |
| 7,833,412 B2 | 11/2010 | Holtz |
| 7,985,335 B2 | 7/2011 | Allard |
| 8,110,105 B2 | 2/2012 | Allen, II |
| 8,287,728 B2 | 10/2012 | Kania et al. |
| 8,333,885 B1 | 12/2012 | Iorio |
| 8,501,016 B2 | 8/2013 | Lord |
| 8,535,533 B2 | 9/2013 | Allard |
| 8,555,586 B2 | 10/2013 | Lowe et al. |
| 8,591,729 B2 | 11/2013 | Alqanee |
| 8,622,647 B2 | 1/2014 | Flood, Jr. et al. |
| 8,679,327 B2 | 3/2014 | Mellott et al. |
| 8,795,518 B2 | 8/2014 | Alsaffar |
| 2002/0057944 A1 * | 5/2002 | Adams et al. ................ 405/39 |
| 2004/0226869 A1 | 11/2004 | McClure et al. |
| 2006/0151387 A1 | 7/2006 | Yost et al. |
| 2007/0068878 A1 | 3/2007 | Stever et al. |
| 2007/0199869 A1 * | 8/2007 | Al-Assfour ................ 210/164 |
| 2007/0262009 A1 * | 11/2007 | Fitzgerald ............... 210/170.03 |
| 2008/0121594 A1 | 5/2008 | Dierkes |
| 2008/0217227 A1 | 9/2008 | Pank |
| 2008/0217257 A1 | 9/2008 | Pank |
| 2008/0251448 A1 | 10/2008 | Kent |
| 2009/0050583 A1 | 2/2009 | Arnott et al. |
| 2009/0218299 A1 | 9/2009 | Cote |
| 2009/0250405 A1 | 10/2009 | Allard |
| 2011/0147303 A1 | 6/2011 | Allard |
| 2011/0186492 A1 | 8/2011 | Holtz |
| 2012/0031854 A1 | 2/2012 | Allard |
| 2013/0001158 A1 | 1/2013 | Condon et al. |
| 2013/0056399 A1 | 3/2013 | Downare |
| 2013/0105387 A1 | 5/2013 | Antoinette et al. |
| 2013/0180903 A1 | 7/2013 | Kowalsky |
| 2014/0001127 A1 | 1/2014 | Hymel et al. |
| 2014/0124424 A1 | 5/2014 | Chai et al. |
| 2014/0202954 A1 | 7/2014 | Lassovsky |

OTHER PUBLICATIONS

PCT, Written Opinion of the International Search Authority for International Application No. PCT/US2010/030206, Date of Mailing: Jun. 10, 2010.
"Service Plaza Stormwater Project," Government Engineering, 40-41, May-Jun. 2007.
Office Action for U.S. Appl. No. 13/263,291, Date Mailed: Aug. 29, 2013.
Rain Guardian, Four Stages of Pretreatment (U.S. Patent No. 8,501,016), screen shots from http://www.rainguardian.biz/index.php?option=com_content&view=article&id=66&Itemid=103, printed on Jan. 2, 2014, 2 pages.
Terre Hill Storm Water Systems, slides entitled "Gray Complements Green, Gray +Green Treatment Train Design: Targets Multiple Urban Pollutants Reduces Maintenance Costs Extends Useful Life of Green Infrastructure Minimizes Urban Blight Enhances Quality of Urban Life," dated Oct. 10, 2012, downloaded on Jan. 2, 2014 from http://berkscd.com/wp-content/uploads/2012/10/Gray-Complements-Green.pdf, 8 pages.
Americast,"Standard Detail—4' Wide Precast Filterra Curb Inlet with Internal Bypass,"DWG: STD_4_FTCB, dated Mar. 3, 2011.
Americast, "Standard Detail—6' Wide Precast Filterra Curb Inlet with Internal Bypass," DWG: STD_6_FTCB, dated Mar. 3, 2011.
Americast, "Standard Detail—8' Wide Precast Filterra Curb Inlet with Internal Bypass," DWG: STD_8_FTCB, dated Mar. 3, 2011.
Americast, "Standard Detail Gutter and Curb Opening Filterra Curb Inlet with Internal Bypass," DWG: DTL_FTCB_GCO, dated Apr. 4, 2011.
"Filterra Curb Inlet with Internal Bypass Design Guidelines California Region," Undated.
"Filterra Curb Inlet with Internal Bypass General Notes," Undated.
Filterra, "Sizing Table for 4' Wide Vault Filterra Curb Inlet with Internal Bypass," "Sizing Table for 6' Wide Vault Filterra Curb Inlet with Internal Bypass," "Sizing Table for 8' Wide Vault Filterra Curb Inlet with Internal Bypass," Undated.
Kristar Enterprises, Inc., "TreePod Biofilter with Internal Bypass (End Inlet)," Drawing No. TPB-IB-0001, dated Mar. 13, 2009.
Kristar Enterprises, Inc., "TreePod Biofilter with Internal Bypass (Side Inlet)," Drawing No. TPB-IB-0002, dated Mar. 13, 2009.
Kristar Enterprises, Inc., "TreePod Biofilter with External Bypass (End Inlet)," Drawing No. TPB-Bb-0001, dated Mar. 3, 2009.
Kristar Enterprises, Inc., "TreePod Biofilter with External Bypass (Side Inlet)," Drawing No. TPB-Bb-0002, dated Mar. 3, 2009.
International Search Report for International Application No. PCT/US 10/30206, with date of mailing Jun. 10, 2010.
Notification Concerning Transmittal of Copy of international Preliminary Report on Patentability (Chapter I of the Patent Cooperation Treaty) for International Application Non. PCT/US2010/030206, with date of mailing Oct. 20, 2011.
Contech Construction Products Inc., UrbanGreen ™ BioFilter Design, Operation and Performance, 2009.
Contech Construction Products Inc., UrbanGreen™ BioFilter Specification, Apr. 2009.
Contech Construction Products Inc., UrbanGreen™ Biofilter UGBF0406 Standard Detail, with date Dec. 2, 2010.
Contech Construction Products Inc., UrbanGreen Biofilter UGBF0406-NC Standard Detail, with date Dec. 2, 2010.
Contech Construction Products Inc., UrbanGreen Biofilter UGBF0608 Standard Detail, with date Dec. 2, 2010.
Contech Construction Products Inc., UrbanGreen Biofilter UGBF0608-NC Standard Detail, with date Dec. 2, 2010.
Contech Construction Products Inc., UrbanGreen Biofilter UGBF0612 Standard Detail, with date Dec. 2, 2010.
Contech Construction Products Inc., UrbanGreen Biofilter UGBF0612-NC Standard Detail, with date Dec. 2, 2010.
Contech Construction Products Inc., UrbanGreen Biofilter UGBF0816 Standard Detail, with date Dec. 2, 2010.
Contech Construction Products Inc., UrbanGreen Biofilter UGBF0816-NC Standard Detail, with date Dec. 2, 2010.

* cited by examiner

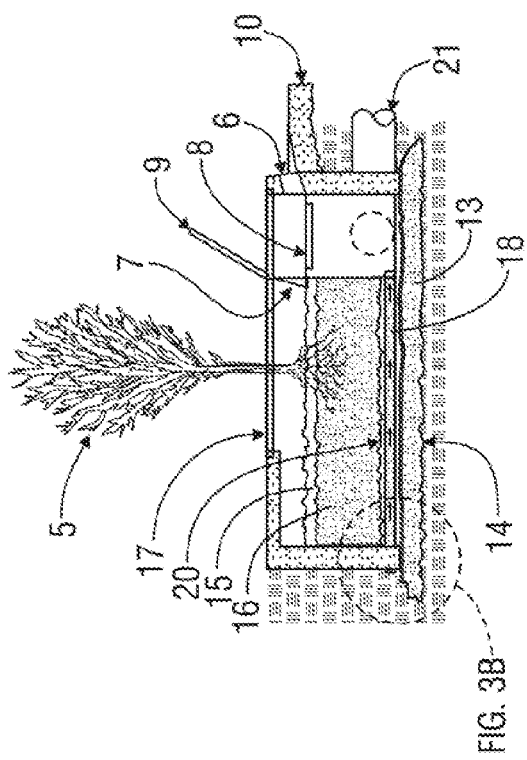
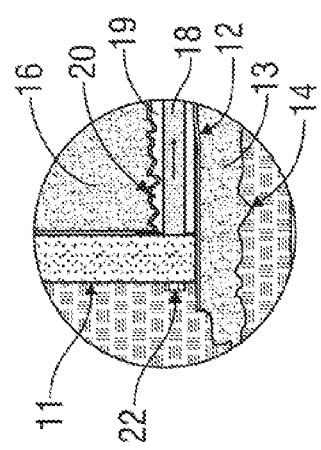
FIG. 3A
FIG. 3B

72" x 48" I.D. Concrete Vault 24" Right Opening Shown.
24" Left Opening uses the same components.

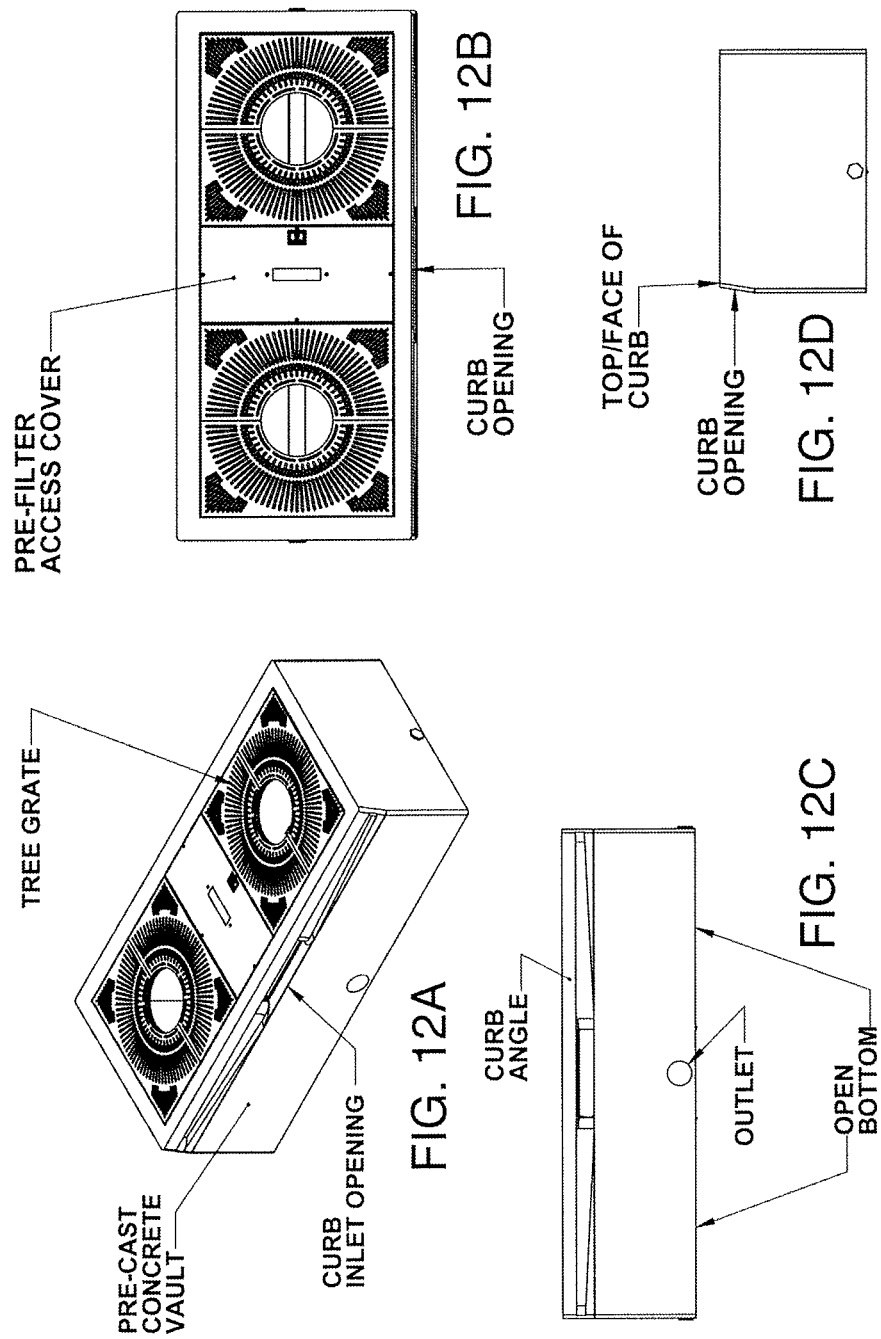

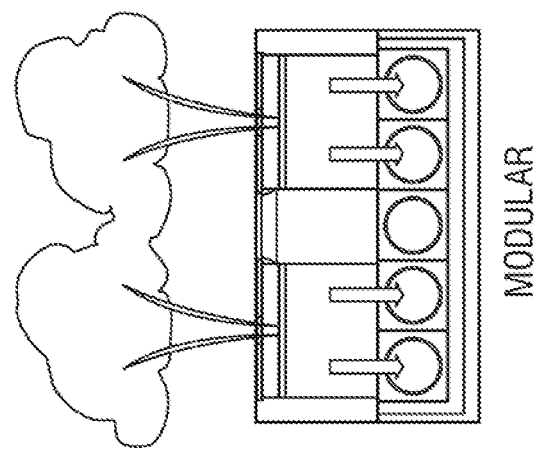
FIG. 13C MODULAR
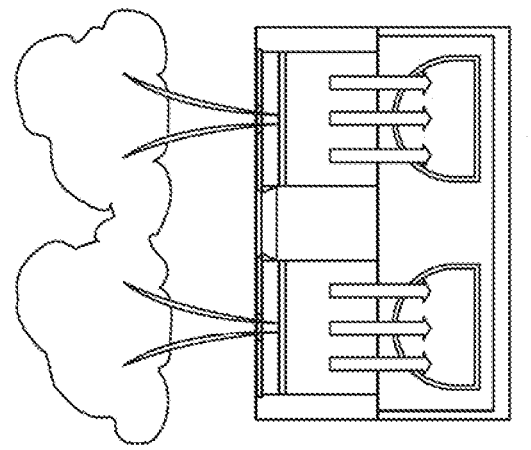
FIG. 13B CHAMBER
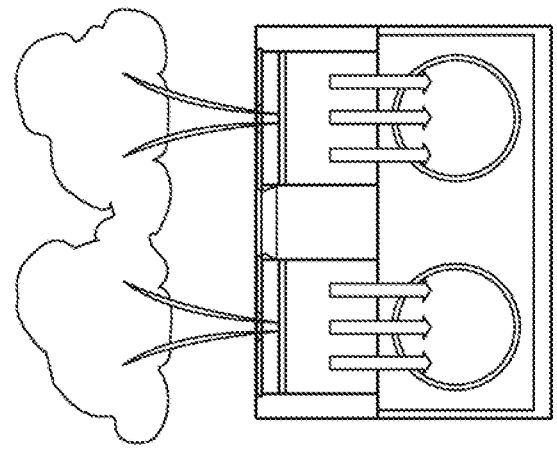
FIG. 13A PIPE

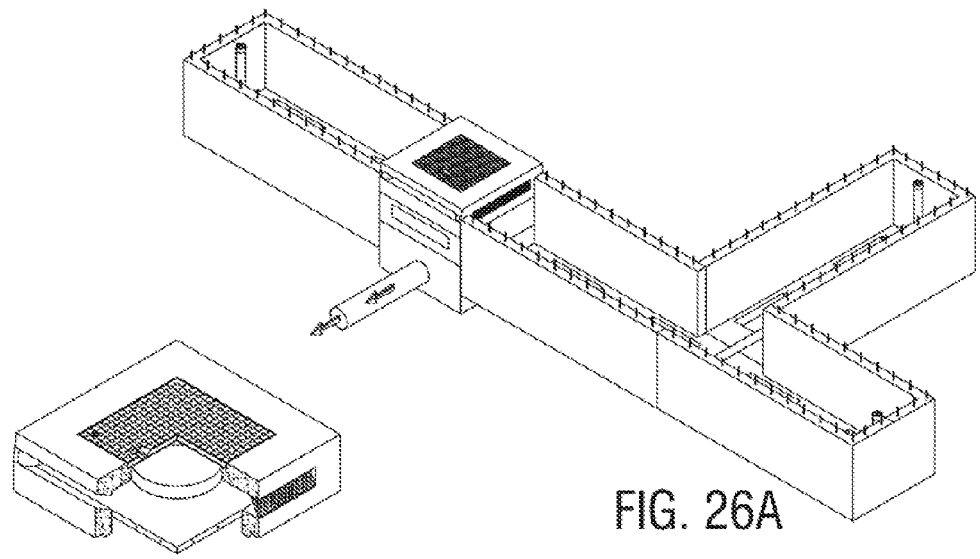
FIG. 26A
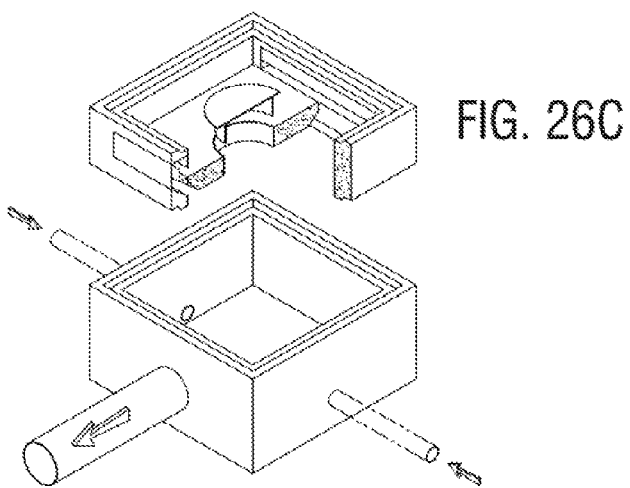
FIG. 26B
FIG. 26C
FIG. 26D

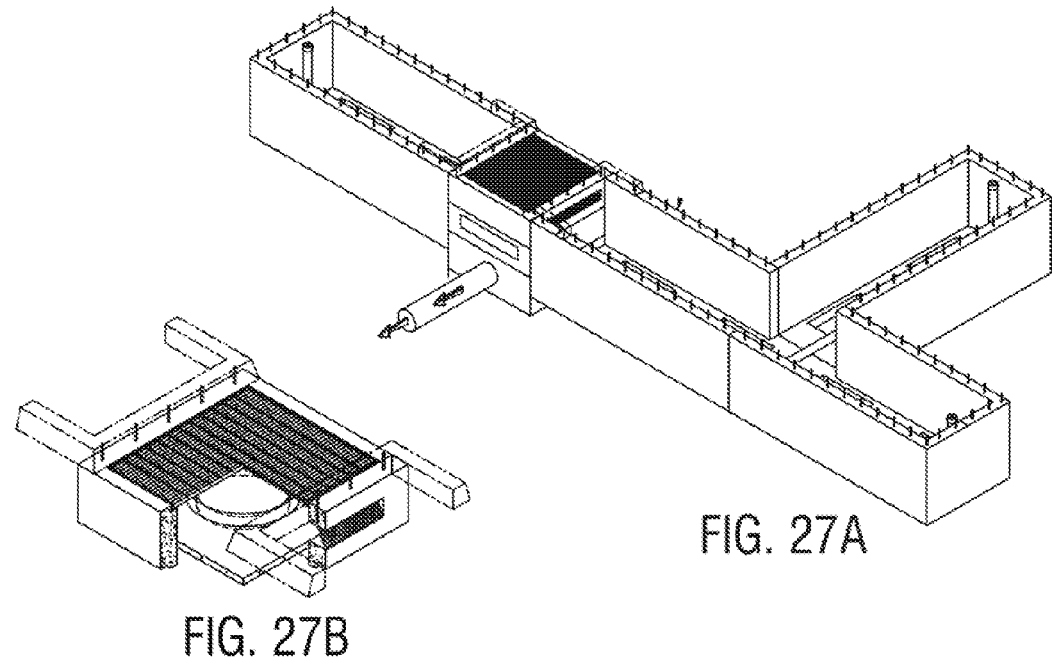
FIG. 27A
FIG. 27B
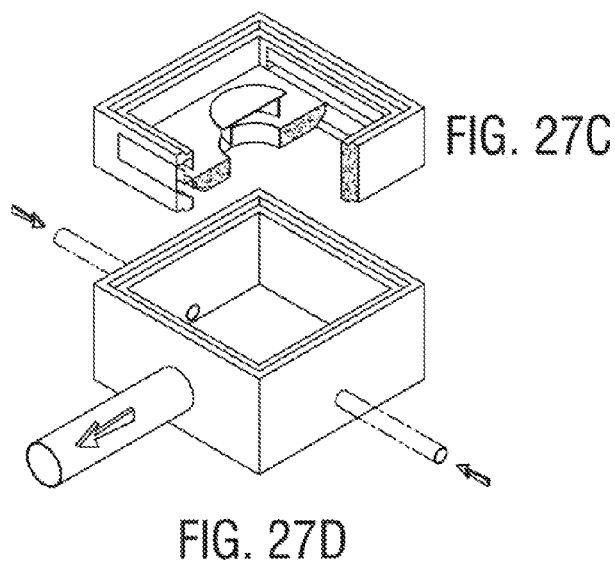
FIG. 27C
FIG. 27D

BIORETENTION SYSTEM WITH INTERNAL HIGH FLOW BYPASS

CROSS-REFERENCE TO RELATED APPLICATION

This is a continuation-in-part application of U.S. application Ser. No. 12/977,015, filed Dec. 22, 2010 now U.S. Pat. No. 8,535,533, which claims the benefit of U.S. Provisional Application No. 61/289,376, filed Dec. 22, 2009.

FIELD OF THE INVENTION

The present invention relates to storm water management systems that are useful for the control of storm water runoff and the removal of pollutants, debris, and other contaminants from storm water runoff; and more specifically, to bioretention systems that are useful for managing storm water flow and inhibiting the flow of pollutants, debris, and other contaminants into drainage systems.

BACKGROUND OF THE INVENTION

Many federal and state regulatory schemes require controlling storm water run-off and water quality, such as levels of pollutants on new developments of land. Before land development, an area will likely have included a variety of natural land features, such as sand dunes, grassy hills and wetlands. The natural land features absorb rainwater and infiltrate storm water runoff into the soil to replenish groundwater and streams. Following land development, however, the area might contain impervious surfaces such as buildings, streets, and parking lots that cover the ground and prevent rainfall infiltration. As a result, storm water runoff can accumulate pollutants such as oil and debris, which then flows into a sewer system or other receiving water bodies.

Bioretention systems for managing and filtering storm water runoff are a well known Low Impact Design ("LID") approaches to mitigate the impacts of impervious surfaces and manage the flow of storm water runoff on developed land. Bioretention systems utilize soils and both woody and herbaceous plants to remove pollutants, including ultra-fine and dissolved pollutants, from storm water runoff close to their source. The systems mimic the natural (i.e., pre-development) storm water flow from the land. One type of bioretention system includes a tree box filter, which is also referred to as a tree box planter.

In a conventional tree box filter, storm water runoff flows into an in-ground or above ground vault-shaped container with bioretention media, including mulch, and engineered soil. As the tree box filter infiltrates and temporarily stores runoff water, the bioretention media captures particulate matter, including ultra-fine and dissolved pollutants, and allows the treated storm water to percolate through the system. The storm water eventually exists through an outlet in the container into a drainage system or water retention/storage system.

One of the concerns that has emerged is the ability of bioretention systems, including conventional tree box filters, to process large quantities of fluid during peak flow periods without having backups that result in localized flooding of the surrounding areas. Most bioretention systems will have an upper limit for the amount of water that can be filtered at any time, as well as a maximum capacity for the amount of water that can be passed through the system in any event.

To address storm water flow during periods of peak flow and increase the upper limit for fluid flow, some bioretention systems employ an external high-flow bypass mechanism. The feature allows excess fluids to proceed through the drainage system without being filtered during periods of high fluid flow. This conventional high flow bypass is a separate structure, often a separate catch basin or similar device connected to the tree box filter by an external pipe or other mechanism and located downstream from the system. However, because the high flow bypass is an external structure—externally added to the tree box or other bioretention system components—its incorporation with tree box filters requires additional space (to accommodate the external bypass structure), as well as additional design, manufacturing, installation, and maintenance costs.

Another concern is the ability of the bioretention system to remove gross pollutants from incoming storm water prior to releasing it. Ideally, the bioretention system should pre-treat (e.g., using filtration systems) water flow from the developed land prior to releasing it. The entrance of gross pollutants, such as trash, debris, floatables, and coarse sediments, are known to "clog" the system and thus reduce the efficiency. It also increases the maintenance frequency of typical bioretention systems. Pre-treatment apparatus that can remove gross pollutants from the treated flows should be incorporated into the bioretention system in order to minimize land usage. The pretreatment apparatus also should be accessible for intermittent cleaning, repair, and/or other maintenance.

In addition, bioretention systems typically are installed under large concrete or asphalt surfaces to treat storm water that has run over impervious surfaces in commercial, residential, and industrial areas such as median strips, parking lots, sidewalks, and swales. They must be capable of bearing highly variable weight loads. It is desirable for the systems to maximize water storage while occupying as small a "footprint" as possible to minimize land usage and site excavation costs.

Accordingly, what is desired is a bioretention system solving many or all of the foregoing problems, including a bioretention system that can effectively process increased amounts of storm water runoff during peak periods of high fluid flow and can efficiently utilize space within a developed land site. It is another objective of the invention to provide a flexible and economical design that simplifies the design of construction of storm water drainage systems. It is yet another objective of the invention to provide a bioretention system that has fewer and more manageable parts that are relatively easy to maintain and service. It is yet another objective of the invention to provide a bioretention system that has pre-filtration capabilities to remove gross pollutants from storm water runoff before it is released.

BRIEF SUMMARY OF THE INVENTION

The present invention is directed generally to a sustainable low impact design for storm water management. The system can include various modules installed in various configurations to receive and treat storm water.

Generally, the system has a vault-like structure comprising a biofiltration chamber (first chamber) designed to incorporate biofiltration media, such as mulch, plants, soil, other organic matter, or a combination thereof, that capture particulate matter (e.g., ultra-fine and dissolved pollutants) from incoming storm water. The vault-like structure also comprises an internal high flow bypass structure including a top and bottom weir. The high flow bypass structure can be contained at least in part within the system. It provides an alternate route for storm water during periods of high fluid flow. As described herein, at least part of the high flow bypass structure can be configured according to the assemblies described in greater detail herein.

In one embodiment, the present invention provides a bioretention assembly for use in an underground storm water management system comprising four sidewalls; a biofiltration chamber disposed within said sidewalls and dimensioned to contain biofiltration media; and a bypass structure disposed within said sidewalls and comprising a top weir (also known as overflow weir) and a bottom weir (also known as underflow weir), wherein the top and bottom weirs are dimensioned to at least partially obstruct fluid flow through the bioretention assembly.

The bioretention assembly can further comprise a substantially rectangular pre-filter chamber (second chamber) disposed within said sidewalls, wherein the pre-filter chamber is dimensioned to fit at a curb inlet opening. The top weir can extend down from the top portion of the pre-filter chamber. The bottom weir can extend up from the bottom portion of the pre-filter chamber. The top and bottom weirs of the bypass structure can also be dimensioned to align with the top and bottom portions of the pre-filter chamber, respectively.

In another embodiment, the present invention provides an underground storm water management system comprising a means for pre-filtering gross pollutants from incoming storm water in a pre-filter chamber; a means for treating storm water passing from the pre-filter chamber in a biofiltration chamber; and a means for releasing untreated flows through a bypass structure, wherein said bypass structure comprises a top weir and a bottom weir, respectively.

In yet another embodiment, the present invention provides a method for treating storm water runoff comprising the steps of removing gross pollutants from incoming storm water in a pre-filter chamber; removing fine and dissolved pollutants from incoming storm water in a separate biofiltration chamber; and releasing untreated storm water through a high flow bypass structure comprising a top weir and bottom weir.

One of the features of the present invention includes a screen along a side of the pre-filter chamber. In one embodiment, a side of the pre-filter chamber is dimensioned to fit at an inlet curb opening and the pre-filter chamber is adjacent to the biofiltration chamber along a substantially perpendicular side. In another embodiment, a side of the pre-filter chamber is dimensioned to fit at an inlet curb opening and the pre-filter chamber is adjacent to the biofiltration chamber along a substantially parallel side.

Another feature of the present invention includes a bypass structure wherein the top of the bottom weir is set at an elevation at or below the bottom of the curb inlet. In one embodiment, at least a portion of the top weir is in front a portion of the bottom weir. The bottom of the top weir is set an elevation below the top of the bottom weir.

Another feature of the present invention includes covers that provide access to the bioretention system. In one embodiment, the pre-filter chamber can comprise a hinged access cover disposed along a top side. The biofiltration chamber can further comprise a grate disposed along a top side. The pre-filter chamber can further comprise an access opening along the bottom floor, connected to the "vault" structure. The covers can provide access for inspection and maintenance purposes.

Another feature of the bioretention system is that it may be assembled in various configurations, from separate modules or components, and used in conjunction with existing storm water storage systems. These include connections to a pipe, chamber, or modular water storage system to address site hydromodification and water quality on a developed site. The pre-filter and biofiltration chambers can be disposed in different configurations relative to a curb or drain inlet to accommodate different surface structures and site requirements. Treated flows may be collected, stored, or infiltrated to help meet different design criteria for the site.

In another embodiment, the present invention provides an assembly for use in an underground storm water management system comprising: a first chamber comprising one or more inlet openings, an opening along a bottom surface of the first chamber, and a raised vertical edge surrounding at least a portion of the edge of the bottom opening; a second chamber disposed below the first chamber and comprising a top opening, one or more side walls, and a flume disposed within at least one side wall, wherein the flume comprises a top weir and a bottom weir; and a third chamber disposed below the second chamber and comprising an outlet opening along a side surface that forms an outlet for storm water flow. The first chamber may be adjacent to a chamber comprising at least one of the following: biofiltration media, mulch, or plant. A side wall of the first chamber may comprise a perforated surface that forms a primary flow path for fluid flow, and the opening along the bottom surface of the first chamber forms a secondary flow path for fluid flow. The assembly may further comprise a trench section along a substantially parallel side of the third chamber.

In another embodiment, the present invention provides an assembly for use in an underground storm water management system comprising a first chamber comprising one or more inlet openings, an opening along a bottom surface of the upper module, a raised vertical edge surrounding at least a portion of the edge of the bottom opening, and a flume disposed within at least one side wall of the first chamber, wherein the flume comprises a top weir and a bottom weir; and a second chamber disposed below the first chamber and comprising an outlet opening along a side surface that forms an outlet for storm water flow. The first chamber may adjacent to a chamber comprising at least one of the following: biofiltration media, mulch, or plant. A side wall of the first chamber may comprise a perforated surface that forms a primary flow path for fluid flow, and the opening along the bottom surface of the first chamber forms a secondary flow path for fluid flow. The assembly may further comprise a trench section along a substantially parallel side of the second chamber, wherein the trench section comprises at least one of the following: biofiltration media, mulch, or plant.

In the below description, numerous specific details are provided, such as the identification of various system components, to provide an understanding of embodiments of the invention. Numerous other variations and embodiments can be discerned from the above-detailed description of the intentions and illustrations thereof. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention. All such variations are encompassed within the scope and spirit of the present invention.

BRIEF DESCRIPTION OF THE DRAWINGS

Embodiments of the present invention may be described with reference to the accompanying drawings.

FIGS. 3A and 3B illustrate schematically a cross-sectional side view of one embodiment of the bioretention system containing biofiltration media and installed in a sidewalk or landscape area. A more detailed cross-sectional view of a bottom corner of the biofiltration chamber is shown in exploded view.

FIGS. 12A through 12D illustrate schematically another configuration of the bioretention system of the present invention. In this "side configuration," the system includes two biofiltration chambers on either side of a pre-filter chamber, all placed on the same side as the curb inlet opening. FIG. 12A illustrates schematically an angled side view of the bioretention system. FIG. 12B illustrates a planar top view of the bioretention system. FIG. 12C illustrates schematically a side view of the bioretention system, along the curb inlet opening side. FIG. 12D illustrates schematically another side view of the bioretention system.

FIGS. 13A through 13C illustrate schematically side views of some of the bioretention systems of the present invention used in conjunction with various storm water storage systems to address site hydromodification and water quality. FIG. 13A illustrates schematically a bioretention system used in conjunction with an underground pipe system. FIG. 13B illustrates schematically a bioretention system used in conjunction with an underground chamber system. FIG. 13C illustrates schematically a bioretention system used in connection with an underground pipe system in a modular manner.

FIGS. 26A through 26D illustrate schematically an embodiment of a curb inlet pre-filter module with trench sections FIGS. 27A through 27D illustrate schematically an embodiment of a grated inlet pre-filter module with trench sections.

DETAILED DESCRIPTION OF THE INVENTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and similar or equivalent to those described herein can be used in the practice or testing of the present invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

I. Overview

The present invention provides a bioretention system for storm water management applications. A wide range of storm water management applications may be addressed using the system described herein. These include but are not limited to include controlling and treating storm water flow in parking lot islands, median strips, and traffic islands, median strips, sidewalks, and swales. The bioretention system can be installed in newly developed land or retrofitted in developed sites during resurfacing.

Figure 1:
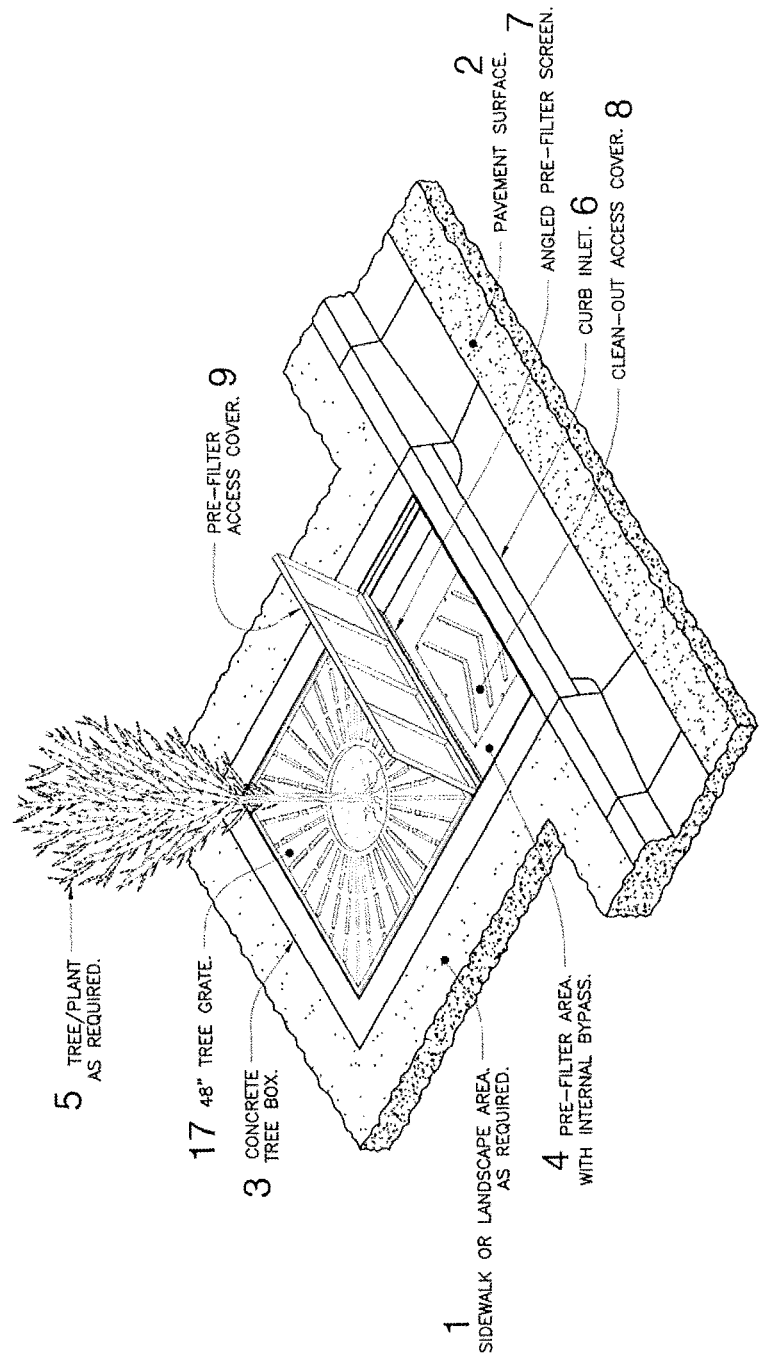
FIG. 1 illustrates schematically an angled top view of one embodiment of the bioretention system of the present invention installed in a sidewalk or landscape area. The biofiltration chamber is adjacent to the pre-filter chamber, and the bioretention system is configured relative to the curb inlet in an "end configuration."
Figure 11:
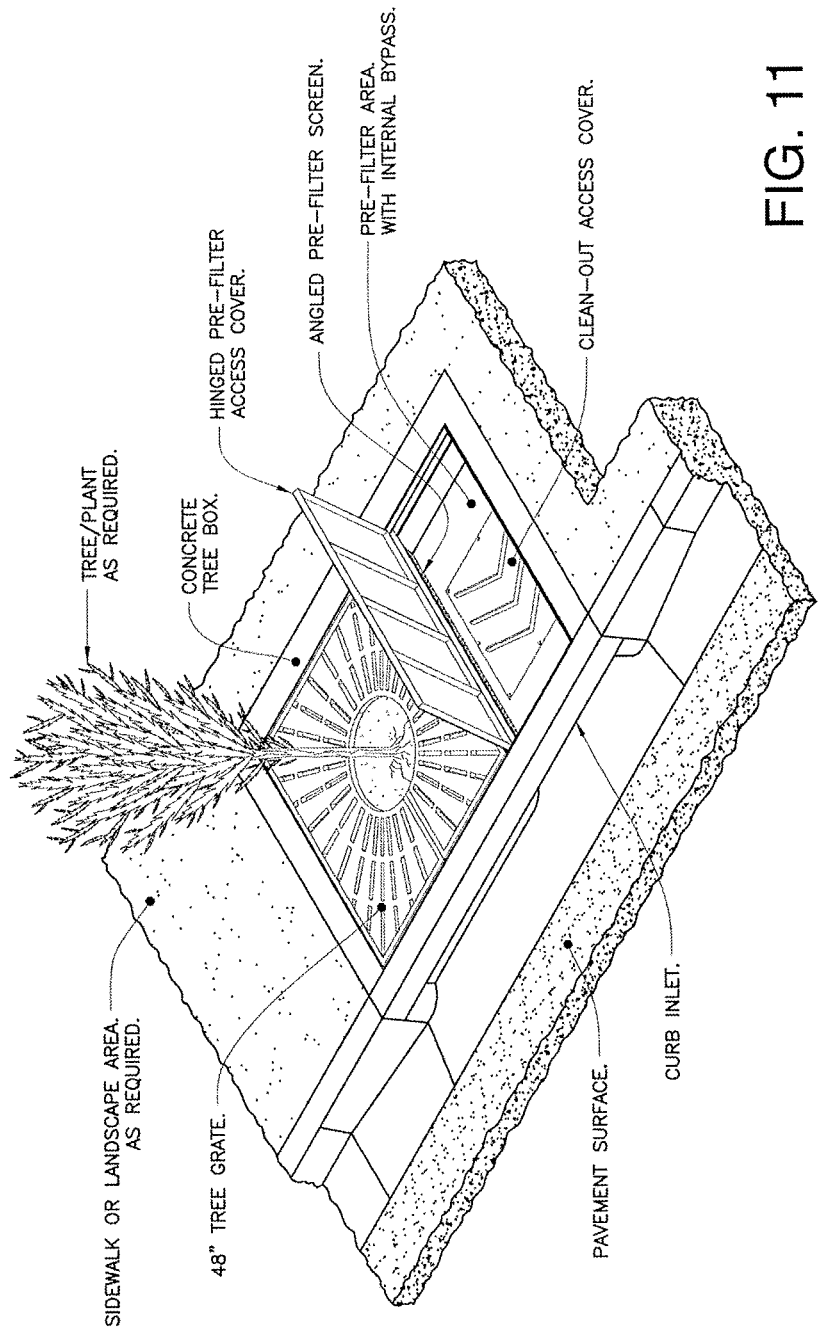
FIG. 11 illustrates schematically an angled top view of a bioretention system with a biofiltration chamber adjacent to the pre-filter chamber. The bioretention system is configured relative to the curb inlet in a "side configuration."

As illustrated in FIG. 1, in one embodiment, a bioretention system is integrated within a sidewalk or landscape area 1. The system rests at least in part underground, below the pavement surface 2, and includes a pre-cast concrete tree box also referred to as a "vault" structure 3 with four sidewalls. The "vault" structure houses a substantially rectangular inlet chamber also referred to as a pre-filter chamber 4, as well as an adjacent biofiltration chamber that is designed to contain biofiltration media and a tree 5, shrub, or other plant and vegetation. Storm water can enter the bioretention system through an inlet opening placed along a curb inlet 6 or drainage inlet or through the tree grate 17. Although the shape of the pre-filter chamber is described in this embodiment as being substantially rectangular, one of ordinary skill in the art will recognize that the pre-filter chamber of the present invention can include other shapes (e.g., non-rectangular, irregular, cylindrical, circular, or other shapes known in the art). The inlet opening can be placed at an end (as shown in FIG. 1) or a side (as shown in the embodiment of FIG. 11) of the tree box.

Figure 8:
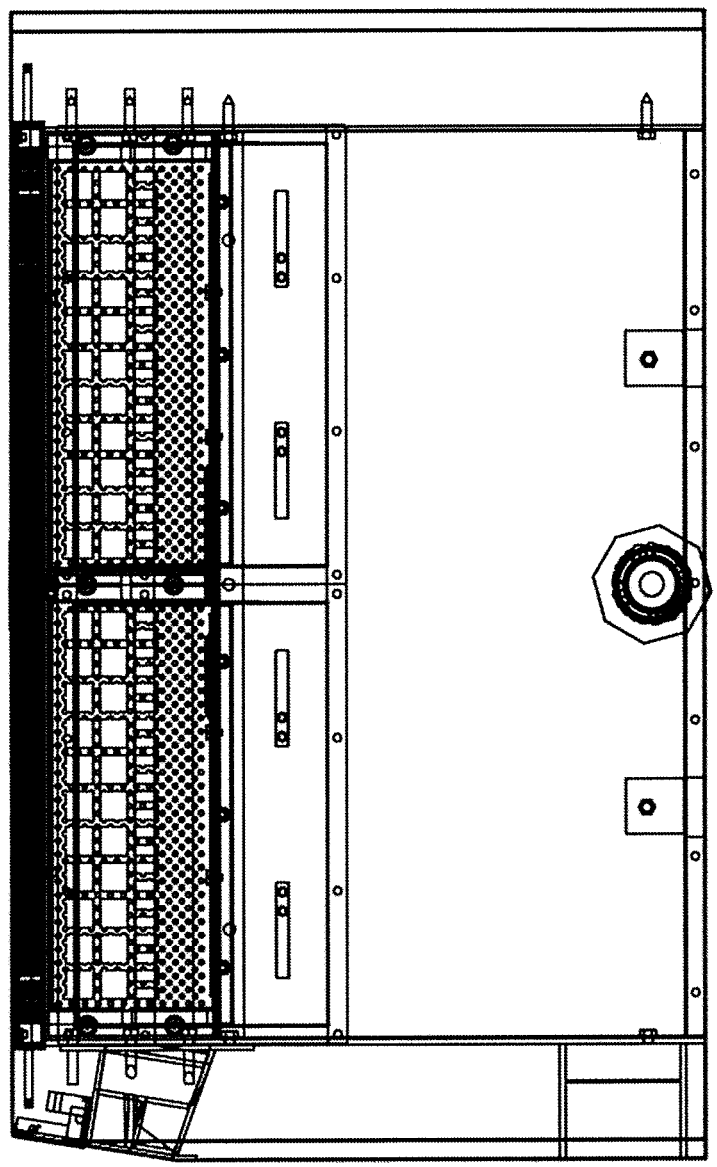
FIG. 8 illustrates schematically a side view of one embodiment of the angled filter screen of the present invention.

Storm water enters the pre-filter chamber through the inlet opening. An angled pre-filter screen 7 (shown in greater detail in FIG. 8) rests between the pre-filter chamber and the adjacent biofiltration chamber containing biofiltration media. The prefilter screen is a permeable, lattice structure with spaces that allows storm water passage, while it obstructs the passage of gross pollutants through the screen. In this way, the prefilter screen can separate gross pollutants, such as trash, debris, floatables, and coarse sediments, from entering storm water and allow the filtered storm water to pass through to the adjacent chamber. Because they can obstruct storm water flow through the bioretention system, such gross pollutants are known to reduce efficiency and increase maintenance frequency of a typical tree box filter. Thus, the use of the pre-filter screen to separate gross pollutants from the entering storm water can increase the overall efficiency and decrease maintenance frequency of the tree box filter.

The pre-filter area includes a moveable "floor," also referred to as a clean-out access cover 8, along a bottom of the area. The floor can be a sheet of metal or other suitable material and the shape depends on the shape of the pre-filter chamber. It can be attached to the bottom of the pre-filter chamber by one or more hinges or other connection mechanisms along a side edge of the floor. The floor can be lifted to allow access to the area underneath the pre-filter chamber.

Gross pollutants that are retained and accumulate in the pre-filter chamber can be removed from the bioretention system by lifting a pre-filter access cover 9 located along a top portion of the pre-filter chamber. The access cover comprises a removable lid of various shapes and sizes and provides an access port to the pre-filter chamber. In one embodiment, the access cover is a hinged structure covering a substantial portion of the pre-filtration chamber. In another embodiment, the access cover is a removable lid without a hinge and rests above at least some portion of the pre-filter chamber. This access cover panel facilitates access to and maintenance of the bioretention system, even when installed in a sidewalk or landscape area. Collected gross pollutants can be removed from the pre-filter chamber through the access cover panel, without disturbing the adjacent area containing biofiltration media.

The presence of the pre-filter chamber and especially pre-filter screen extends maintenance intervals and can help assure peak filter performance. The ability to separately maintain, clean, and/or repair the bioretention system with relative ease through the access cover panel provides a significant advantage in the use of such systems.

II. Normal Flow Conditions

Under normal flow conditions, storm water entering the pre-filter chamber from the curb inlet (or other source opening) can be directed downward and sideways through the pre-filter screen and into a biofiltration chamber. FIGS. 3A and 3B illustrate schematically a cross-sectional side view of one embodiment of the bioretention system containing a tree planted in mulch and biofiltration media, as installed in a sidewalk or landscape area. As shown, the bioretention system is housed within a substantially rectangular tree box or "vault" structure. Although the shape of the vault is described in this embodiment as being substantially rectangular, one of ordinary skill in the art will recognize that the bioretention system of the present invention can include other shapes (e.g., non-rectangular, irregular, cylindrical, circular, or other shapes known in the art). The prefilter chamber includes an angled pre-filter screen and is adapted to receive storm water from a curb inlet. The floor of the pre-filter chamber 8 is located below the gutter flow line 10. A biofiltration chamber is at least partially enclosed by sidewalls of the concrete tree box 11 and forms a chamber for the biofiltration media 16.

Figure 9:
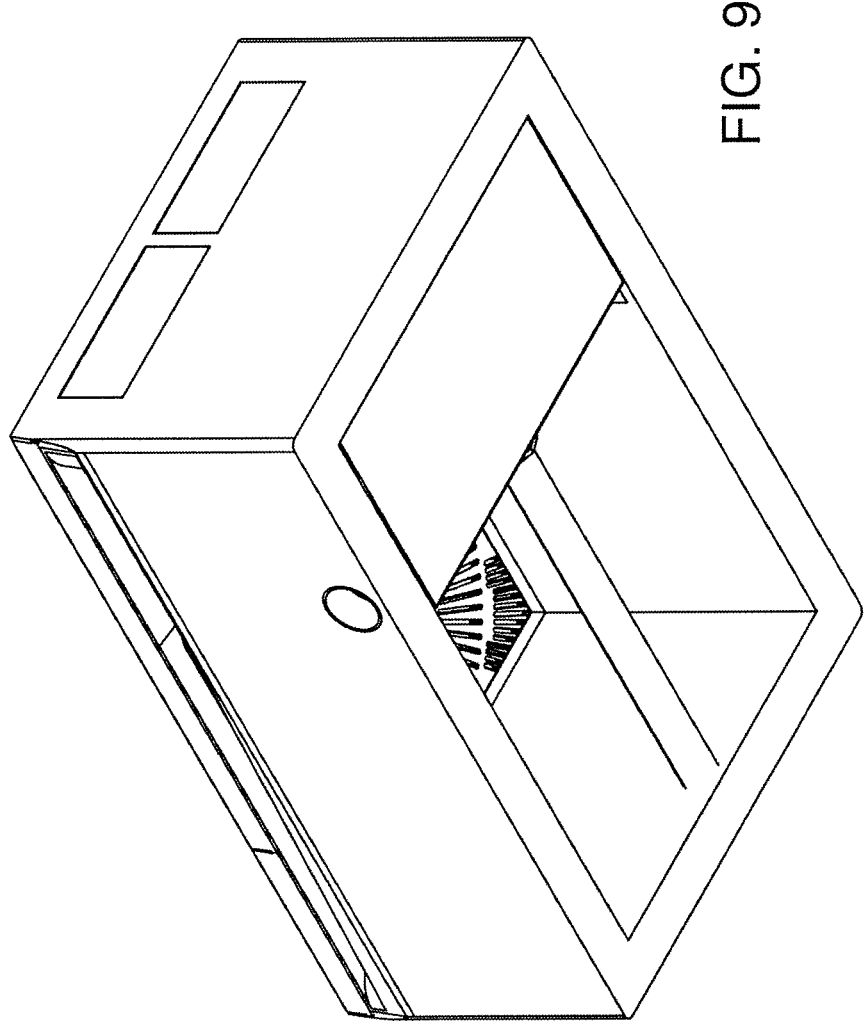
FIG. 9 illustrates schematically an angled bottom view of one embodiment of the bioretention system of the present invention.

In a preferred embodiment, the biofiltration chamber is directly adjacent to the pre-filter chamber. Three sidewalls of the tree box form three of the sidewalls of the biofiltration chamber. A side of the pre-filter chamber and a divider below the pre-filter area (shown in FIG. 5A, discussed below) form the fourth sidewall of the biofiltration chamber. Together, the four sidewalls form a chamber or an enclosure for the biofiltration media 16. The bottom of the biofiltration chamber can be substantially open, as shown in FIG. 9. The open bottom of the biofiltration chamber can be optionally lined with a permeable or impermeable liner 12, if needed, as shown in FIG. 3B. The bioretention system rests on a bedding material layer 13 that is placed above the excavation line 14.

The biofiltration chamber can contain planting mulch 15 and biofiltration media 16, as well as several layers of materials for storm water infiltration. The materials can include one of many known compositions that have been proven effective in the removal of ultra-fine and dissolved pollutants from storm water (e.g., engineered planting soils). The biofiltration media can be designed, for example, to capture very fine sediments, nutrients, metals, oils, grease, organics and bacteria. In one embodiment, a layer of plant materials, ground cover, and/or planting mulch 15 is placed above biofiltration media 16, and a tree 5 or other plant is placed in the biofiltration chamber. The composition of the biofiltration chamber can be customized to target specific pollutants and/or meet site specific pollutant removal criteria. The ordinary artisan will recognize that a wide range of filter media, including known engineered soils, are available and can be used in the biofiltration chamber of the present invention.

Figure 2:
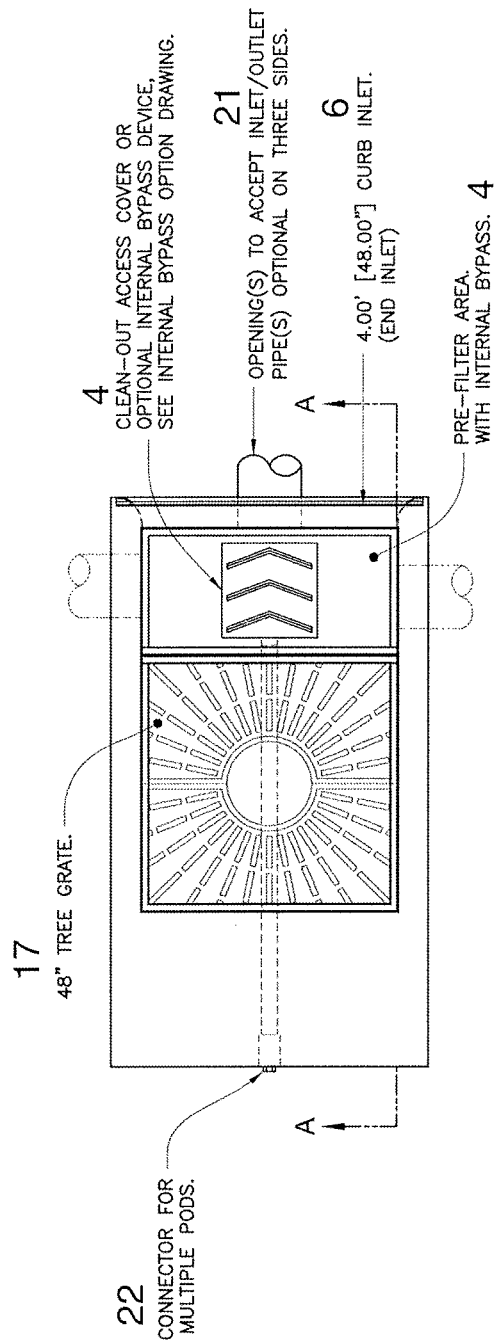
FIG. 2 illustrates schematically a planar top view of one embodiment of the bioretention system of the present invention with openings for outlet pipes on three sides of the tree box. A perforated pipe extends from the bottom of the biofiltration chamber to transport fluid to an outlet of the bioretention system.

As shown in FIGS. 1 and 2, a tree grate 17 rests above the biofiltration chamber. The tree grate has openings to allow storm water to flow into the biofiltration chamber. As shown in FIG. 3, a perforated pipe 18 is disposed horizontally along a bottom of the biofiltration chamber. The perforated pipe or other fluid conveying apparatus can be cylindrical in shape. The pipe 18 or fluid conveying apparatus includes openings along its length that are designed to permit water flowing through the mulch 15 and filter media 16 to leak into the pipe. In some embodiments, the perforated pipe 18 is surrounded by a layer of drain rock 19 and placed between a geotextile liner 20 and/or permeable or impermeable liner 12 as required.

In some embodiments, the assembly is surrounded at least in part by an impermeable liner (e.g., PVC, HDPE) to function as a storage or detention system. In other embodiments, an impermeable liner may also be wrapped around perforated pipe to provide additional protection against unfiltered water leakage into the rest of the assembly resulting in contamination. In yet other embodiments, the assembly is surrounded by a woven or non-woven geotextile liner to function as a water infiltration or retention system. The bedding material layer placed above the excavation line provides, among its functions, overall structure support for the bioretention system.

During routine flow the storm water, which is also referred to herein as "first flush flow" or "low flow," passes from the pre-filter chamber through the angled pre-filter screen 7 to a biofiltration chamber containing planting mulch 15 and filter media 16. The storm water then percolates through the filter media until it reaches the bottom of the biofiltration chamber. The treated storm water is captured in one or more perforated pipes 18 located near the bottom of the biofiltration chamber. The treated Storm water flows through the pipe 18 and can then be released through one or more outlet openings 21 to an underground pipe or other storm water retention or detention system.

Appropriate outlet openings may be fit to the top, bottom, or side face openings in the "vault" structure or tree box. The ordinary artisan will recognize that the absolute dimensions of the openings can be selected to accept industry standard pipe connections/fittings (e.g., rubber boots). Such fittings can offer flexible and water tight connections between the bioretention system and piping for controlling water flow into and out of the system. Connectors placed along a side of the tree box 22 can be used to join multiple bioretention systems. The modular nature of the system can increase processing of storm water for a particular land site, as required by the user.

In one embodiment, the first flush flow travels horizontally through a perforated pipe 18 along a bottom of the biofiltration chamber through one or more side face outlet openings in the "vault" structure (underneath the pre-filter area), and into an underground water retention and/or detention system. The ordinary artisan will recognize that the outlet opening can be fitted with (or easily adapted for fitting with) any fitting, pipe, or valve system, well-known in the art of water management systems.

II. High Flow Bypass Formed Using an Up and Over Weir

A high flow bypass structure can be integrated within the bioretention system to accommodate periods of high flow. During periods of peak flow (for example, heavy rain events, extreme storm conditions or other flood type conditions), at least a portion of the storm water entering the system is not treated in the biofiltration chamber and is instead allowed to accumulate to a pre-filter depth in the pre-filter chamber. Once the storm water rises to the pre-filter depth, the storm water then flows over a weir or a baffle and through an opening in the bypass structure. The storm water bypasses the biofiltration chamber (is not treated by the biofiltration media) and is released through one or more openings along a side of the bioretention system. Once it is released from the bioretention system, the bypass flows can enter a pipe or other storm water retention or detention system.

Figure 4:
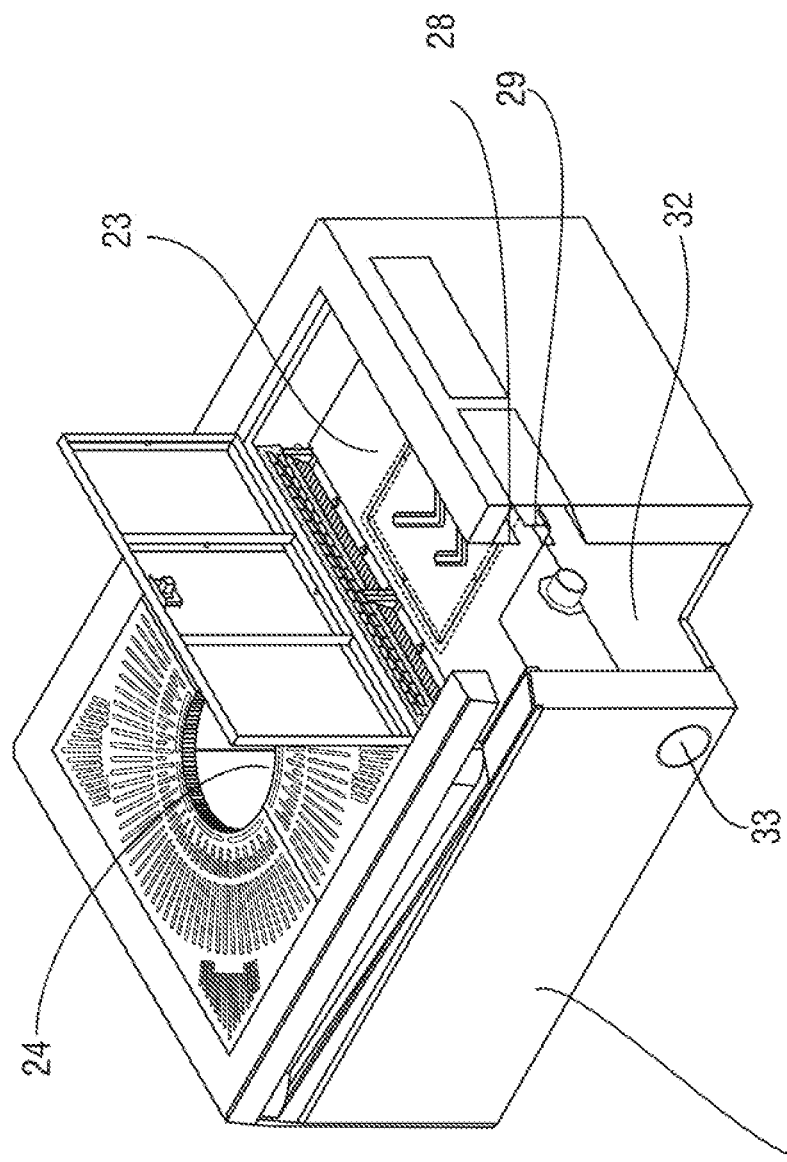
FIG. 4 illustrates schematically an angled side view of one embodiment of the bioretention system in a "side configuration." The corner cutaway illustrates schematically a preferred embodiment of the pre-filter chamber with a high flow bypass structure.
Figure 5:
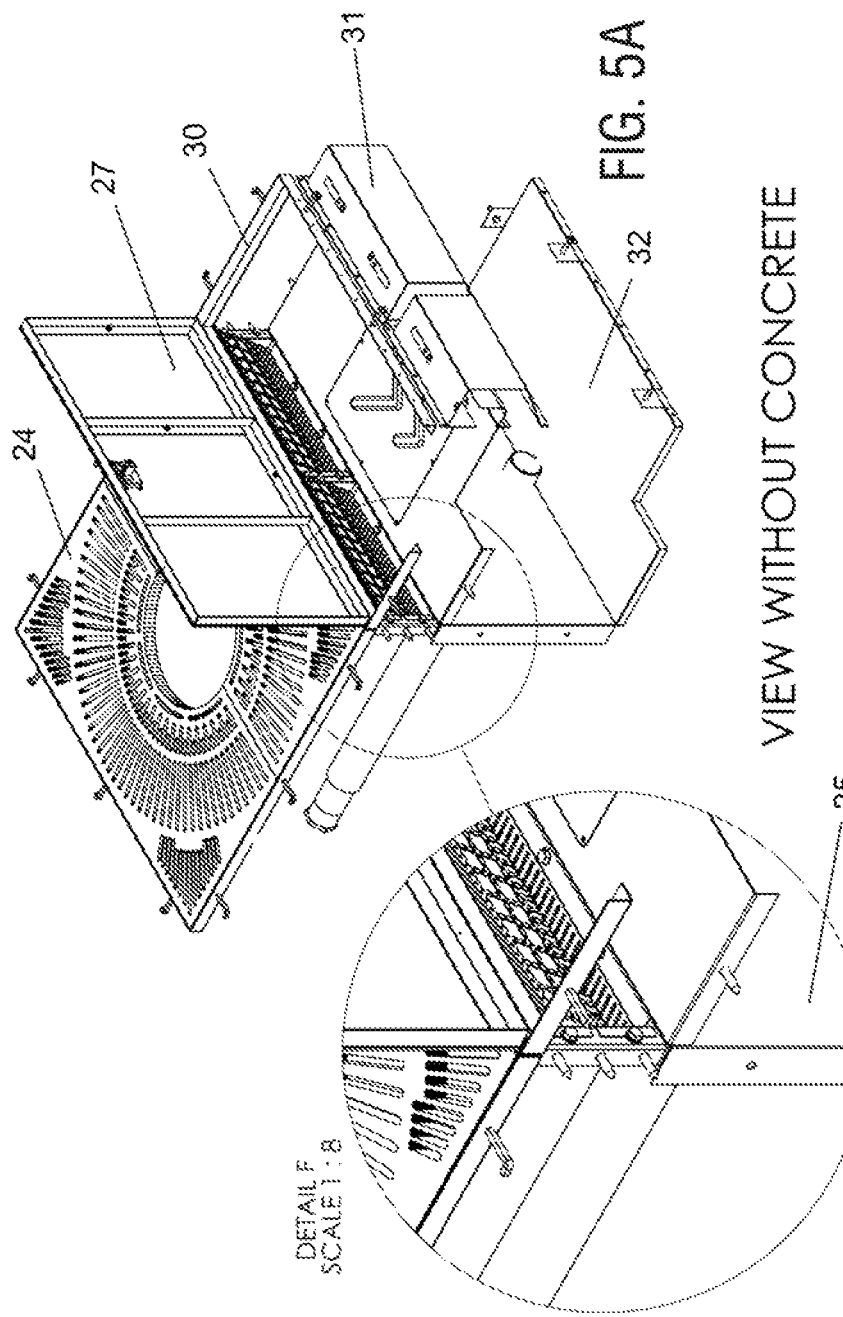
FIGS. 5A and 5B illustrate schematically an angled side view of some of the internal components of one embodiment of the bioretention system without concrete. A pre-filter chamber is adjacent to a biofiltration chamber. In addition, a side profile of the bioretention system is shown in exploded side view.

FIGS. 4, 5A, and 5B illustrate schematically one embodiment of a bioretention system with an internal high flow bypass of the present invention. A "vault-like" free box includes a pre-filter chamber 23, as well as a biofiltration chamber 24. A divider wall 25 separates the biofiltration chamber from the remaining parts of the system. An internal high flow bypass structure is located along the side of the pre-filter chamber. A tree grate 26 rests above the biofiltration chamber. A cover 27 allows access to the pre-filter chamber. In one embodiment, the bypass structure can be cast right into the sidewall of the tree box structure so the capacity of the neighboring biofiltration chamber 24 is not significantly affected by the incorporation of the internal bypass structure. This integration of the bypass structure into the sidewall of the system maximizes the space and capacity of the system to process storm water flow, reduces the overall "footprint" of the system, and reduces overall fabrication and material costs. In addition, the incorporation of a bypass within the pre-filter chamber can minimize the disturbances in the biofiltration chamber.

The bypass structure includes a set of baffles or weirs, including a vertical baffle or top weir 28 and another vertical baffle or bottom weir 29. At least a portion of the top weir is placed in front of the bottom weir. The top weir extends downward from a top portion of the pre-filter chamber and closes off a portion of the wall of the pre-filter chamber to obstruct fluid flow. In one embodiment, an upper portion of the top weir can be aligned with the edge of a top frame 30 that rests along the rim of the tree box structure.

The bottom weir is a partial wall placed behind the top weir. It extends upward from a bottom portion of the pre-filter chamber and terminates before it reaches the top of the pre-filter chamber. In this way, the bottom weir forms a partial wall that is impermeable to water. The bottom weir redirects water toward the biofiltration chamber during normal flow periods, while allowing bypass flow when the water rises above the height of the bottom weir. The bottom weir can be integrally part of the pre-filter chamber and constructed from the same piece of material as the inlet chamber, such that the unit is manufactured as one piece. Alternatively, the bottom weir can be a separate structure, otherwise adapted to align with the openings of the pre-filter chamber through mechanisms known by ordinary artisans.

During peak periods of fluid flow, storm water accumulates in the pre-filter chamber as it reaches the height of the bottom weir, i.e., the pre-filter depth. After the storm water exceeds the pre-filter depth, storm water will flow over the bottom weir and through the bypass opening. The pollutants are accumulated at the bottom of the pre-filter chamber and the bottom weir can act as a filtration mechanism by obstructing the flow of pollutants into the bottom portion of the tree box. The bypass flow is then directed through a flume 31 to the lower portion of the tree box 32 where it can be released from the system without entering the treatment area. In one embodiment, the bypass flow is directed to a bottom portion of the tree box 32 underneath the pre-filter chamber and then exits through an outlet opening 33 located in the bottom of the tree box. In a preferred embodiment, to prevent backups, the height of the bottom weir is set at or below the flow line of the inlet (i.e., at or below the gutter elevation) so that the storm water can be directed to the bypass before it flows back onto the street.

In a preferred embodiment, the high flow bypass structure is cast in the side of the wall of the high flow bioretention system. The height of the bottom of the bottom weir is designed to correspond to the height of the "floor" of the pre-filter chamber. Further, the height of the bottom of the top weir is set below the height of the top of the bottom weir. During periods of normal flow, the top weir can first direct incoming water from the curb inlet to the bottom of the pre-filter chamber before it exits through the high flow bypass opening. In this way, the amount of untreated flow (as well as suspended pollutants) that can escape via the bottom weir is reduced.

Figure 6:
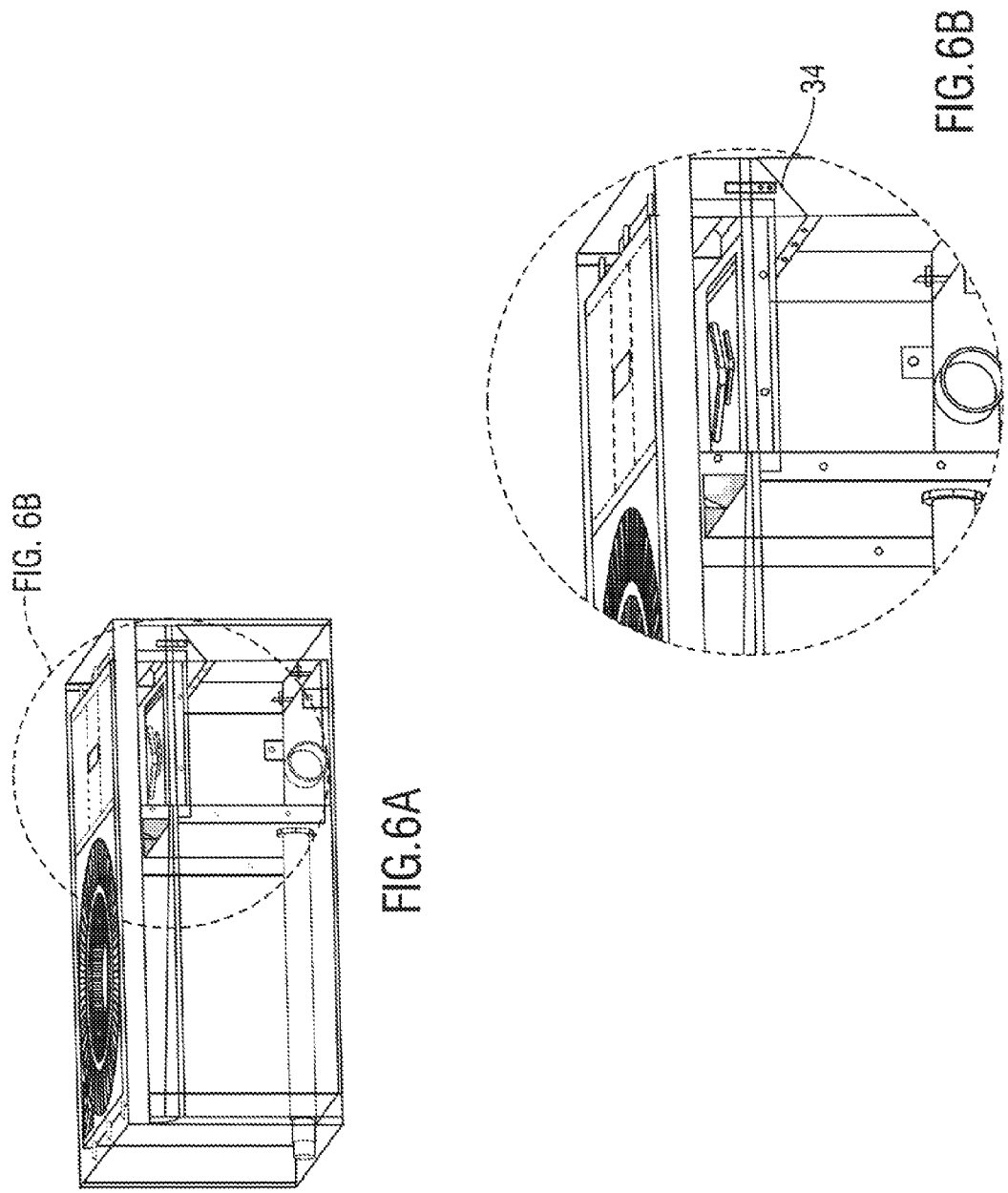
FIGS. 6A and 6B illustrate schematically a cross sectional side view of a concrete vault with a high flow bypass flume located along a side of pre-filter chamber.
Figure 7:
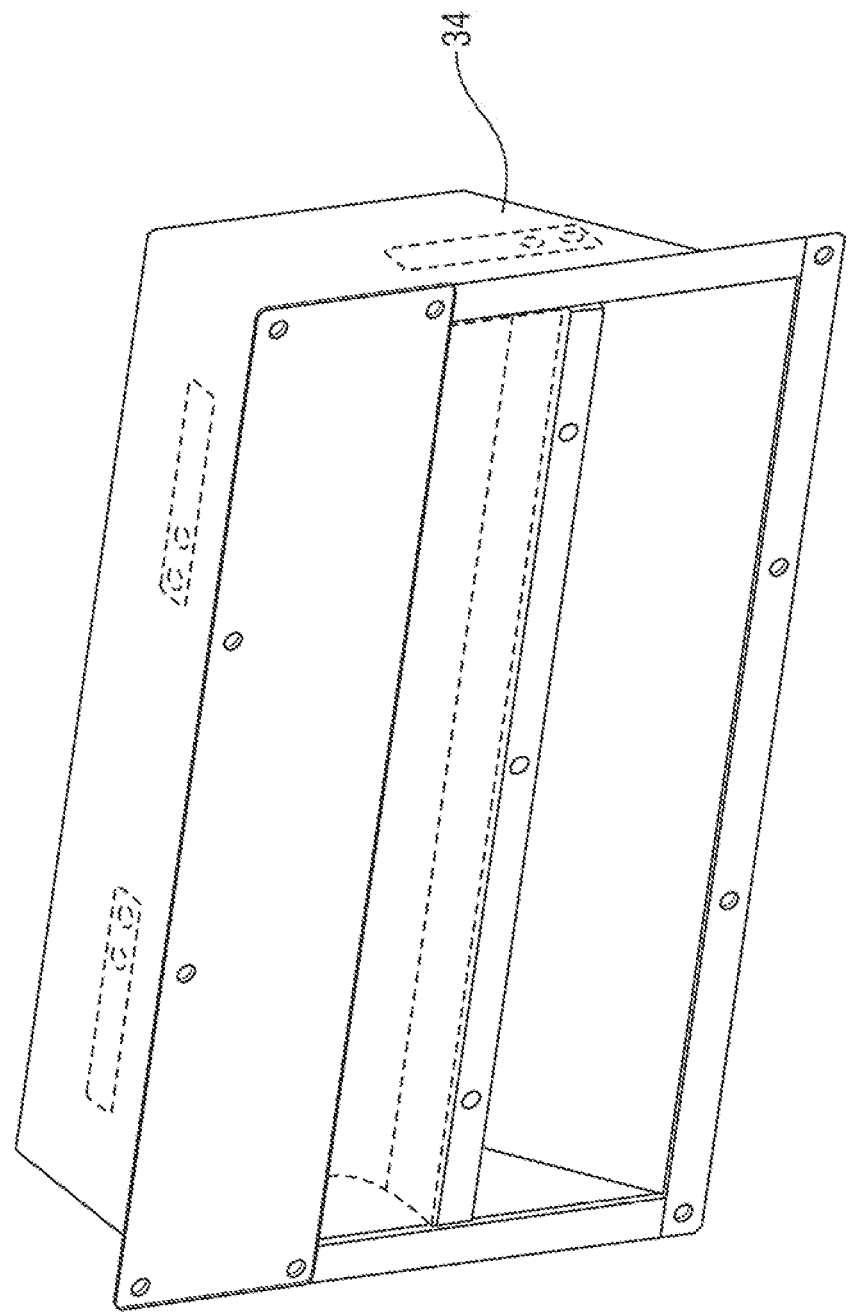
FIG. 7 illustrates schematically an angled side view of some of the components of the high flow bypass structure of FIGS. 6A and 6B in more detail.

FIGS. 6A, 6B, and 7 illustrate schematically in more detail one embodiment of the high flow bypass structure of the present invention. As shown in FIG. 7, the high flow bypass structure can include openings along a front side for fluid flow. At least one of the surfaces along a back side is angled such that the lower portion of the bypass structure forms a flume 34 or a channel to direct storm water flow downward during high flow conditions.

The high flow bypass structure also includes a top weir extending from a top portion of the bypass structure. The top weir extends downward from the top of the structure and terminates before it reaches the bottom of the structure. The top weir is designed to obstruct a part of the opening along the front side of the high flow bypass structure (during normal flow situations), while allowing some storm water to flow through the opening during high flow situations.

A bottom weir is located near the bottom of the high flow bypass assembly. The bottom weir is formed from a substantially "L-shaped" or arched structure with a substantially horizontal portion at the bottom and a substantially vertical portion. In one embodiment, the height of bottom of the bottom weir is designed to correspond to the height of the "floor" of the inlet chamber. The height of the bottom weirs, however, can be designed to accommodate different flow rates and different bypass flows. In one embodiment, when higher bypass flow is desired (for example, during periods of peak flow), the height of the bottom weir is lowered. The ability to efficiently regulate the amount of bypass flow through adjusting the height of the weirs provides a significant advantage in the use of such systems.

During periods of high flow, the storm water is allowed to accumulate to the height of the top of the bottom weir. When the height of the storm water exceeds the height of the top of the bottom weir, the storm water will flow over the bottom weir, down toward the flume, and through a bypass opening into the bottom of the bioretention system 32. The angled lower portion of the flume leads bypass flow from the bottom weir to the bottom of the bioretention system 32. The bypass flow will exit through an opening at the bottom of the bioretention system 33. It can then enter external piping or another water detention/or retention system.

Figure 10B:
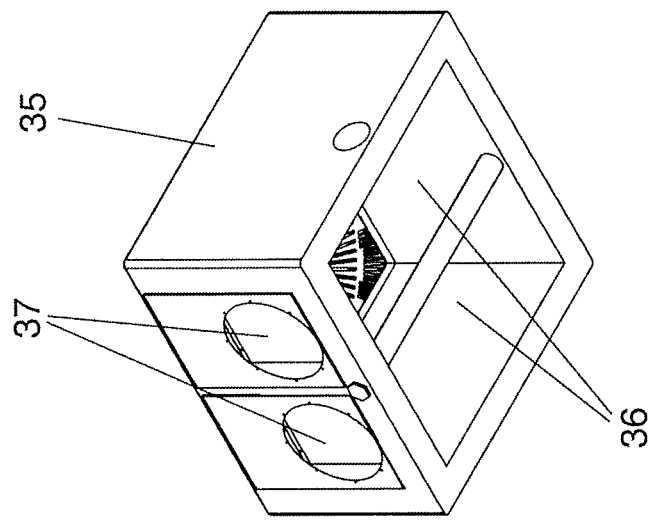
FIGS. 10A and 10B illustrate schematically angled side views of another embodiment of the bioretention system with no pre-filter chamber. The high flow bypass structure is located along a sidewall of the biofiltration.
Figure 10A:
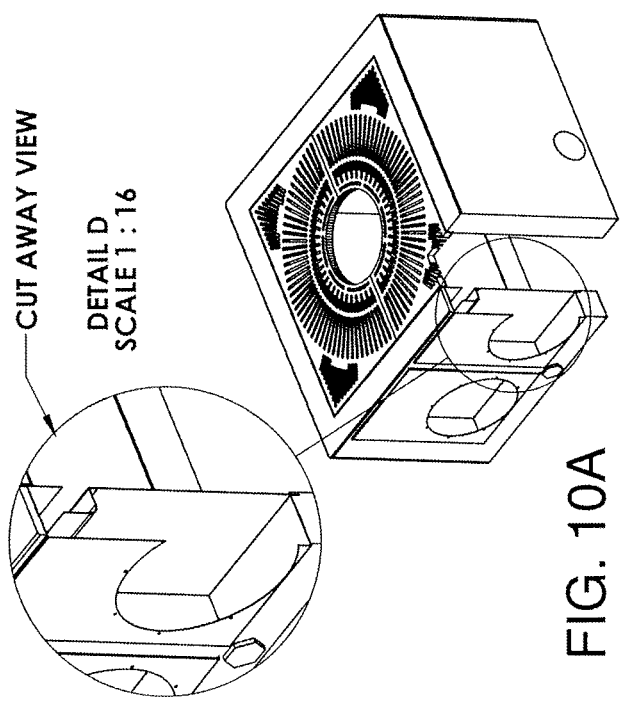

In another embodiment, multiple high flow bypass structures can be incorporated in the bioretention system to further increase the capacity to process high fluid flow. For example, two bypass structures can be placed side by side along a sidewall of the prefilter chamber (as shown in FIGS. 10A and 10B, described below). The bypass structures can also be cast onto different sides of the inlet chamber. In some instances, in addition having an internal bypass structure as described above, it might be desirable for the bioretention system to be used in connection with another separate external bypass structure.

In yet another embodiment, the high flow bypass structure can be incorporated into a bioretention system without a pre-filter chamber. As shown in FIGS. 10A and 10B, a pre-cast concrete vault 35 includes four sidewalls with an open bottom 36. Two internal high flow bypass structures, each including a top weir and a bottom weir, are incorporated into a sidewall of the vault. Outlet openings 37 allow bypass flow to exit the bioretention system. During peak periods of fluid flow, water entering the bioretention system through the tree grate 39 has an alternate flow route. Bypass flows are transported past the bottom weirs, through the bypass chamber 38, and then exit through outlet openings 37, as an alternative to release through the pipe at the bottom of the bioretention system.

While the further addition of a separate external high flow bypass may be desirable in some instances, the use of the internal high flow bypass structure of the present invention significantly increases the flow capacity of the overall system. Thus, there may be no need for a separate external bypass system to process excess storm water flow for a particular site. Moreover, there can be optional multiplication and variable placement of bypass manifolds in the present invention. The ability to incorporate an internal high flow bypass within the bioretention system can significantly reduce space demands, fabrication and material costs, and simplify maintenance procedures. The presence of the high flow bypass feature increases the capacity of the system to process storm water flow. In addition, the integration of the high flow bypass into the "vault" structure reduces space demands and facilitates construction of the system. The ability to install, fabricate, and maintain the bioretention system with relative ease provides a great advantage in the use of such systems.

IV. Adaptability to Different Flow Rates and Construction Sites

A. Sizes

The bioretention system can be designed in different sizes to accommodate different flow rates and types of fluid flow. The ordinary artisan will recognize that there is a correlation between the size of the inlet and flow rate. The deeper and wider a particular inlet, the more flow it can accept, and the more bypass capability is required. In some embodiments, it is contemplated that the dimensions of the vault or tree box structure (and the shell of the high flow bypass) can vary within a range dependent on one or more design factors including but not limited to: desired water volume capacity, desired weight of each modular vault structure, desired load-bearing tolerance for each unit, desired amount of water flow to be managed, size and structure of overall assembly in which the vault structure is used, and/or the desired access space for inspection and maintenance purposes.

An advantage of the bioretention system of the present invention is that its design is scalable. Moreover, the system can be manufactured in standard sizes and shapes to meet different site requirements. The following illustrates possible flow capacities for exemplary tree box vaults designed according to the present invention.

| Pod Size | Unit Outside Dimensions | Rated Flow Capacity (GPM/CFS) | Impervious Area Treated (ACRE) |
|---|---|---|---|
| 4' × 4' | 5' × 7' | 16/0.036 | 0.22 |
| 4' × 6' | 5' × 9' | 24/0.054 | 0.33 |
| 4' × 8' | 5' × 11' | 32/0.071 | 0.44 |
| 6' × 6' | 7' × 9' | 36/0.080 | 0.50 |
| 6' × 10' | 7' × 13' | 60/0.134 | 0.83 |
| 6' × 12' | 7' × 15' | 72/0.160 | 1.00 |

The sizes and flow rates listed above are provided for illustrative purposes and are not intended to limit the scope of the invention. The ordinary artisan will recognize that the shape of the tree box and absolute dimensions can be varied based on the range of design options available, e.g., materials, water management application, excavation site, etc. For example, smaller dimensions may be selected for residential water management applications where less underground water retention/detention volume is needed or available. Alternatively, larger dimensions may be desired for larger industrial application, particularly where solid body construction modular units are used (e.g., pre-cast concrete embodiments).

B. Configurations

The bioretention system of the present invention can also be configured in different arrangements for different flow and treatment capacities. As shown in FIGS. 1 and 2, in an "end configuration" the biofiltration chamber can be placed adjacent to the pre-filter chamber but away from the curb inlet opening. This configuration can be adapted for use, for example, in narrow, trench-like areas.

Alternatively, in a side configuration, as shown in FIG. 11, the biofiltration chamber is located along the same side as the curb inlet opening and adjacent to the pre-filter chamber. In this configuration, the biofiltration chamber is located in a relatively closer distance from the curb, as compared with the end configuration. In either side or end configuration, the biofiltration chamber can include one or more tree grates and one or more trees. A side configuration with two biofiltration chambers, with a pre-filter chamber interposed in between the two biofiltration chambers, is shown in FIG. 12.

Further, as shown in FIG. 4 (discussed above), in some embodiments, a connector pipe or other connecting means are integrated into the structure to laterally couple the bioretention system to other filtration modules or structures. In this way, multiple biofiltration chambers can be placed in series to process additional storm water flow. The connecting means may comprise a separate connector piece (e.g., fasteners, pins, rods, or clips) introduced during assembly of the bioretention system.

The modular nature of the systems allow for customization based on the size and needs of a given area. The filtration modules can be constructed for use with a built in place bioretention system. Alternatively, they can be built with the bioretention system in one structure. The modular nature of the components allow engineers to design bioretention systems to allow for filtration and to manage peak flows. It also addresses the structural concerns associated with the construction of bioretention cells located adjacent to load bearing surfaces such as parking lots.

C. Materials Used for Construction

The ordinary artisan can recognize that materials commonly used in applications involving underground retention/detention of water can be employed with in the present invention. Generally, any material that can be molded or cast can be used to fabricate the vault or tree box structure.

For example, the bioretention system can be constructed of durable precast concrete. One-piece construction ensures ease of installation and long service life. To further enhance ease of handling and installation, the bioretention system can also be constructed, in whole or part, of metal (e.g., aluminum or stainless steel), and/or fiberglass. Other materials useful for construction of the bioretention system components and assemblies constructed therefrom include but are not limited to: polypropylene, high density polyethylene, low-density polyethylene, or rubber.

D. Hydromodification

The bioretention system may be used in conjunction with numerous different storm water systems to address hydromodification, hydraulic features, and water quality in a given land site. For example, as shown in FIG. 13A, the bioretention system may be used with an existing underground pipe system. As shown in FIG. 13B, the bioretention system may also be used with an underground chamber system. As shown in FIG. 13C, the bioretention system may also be used in a modular manner with an underground pipe system. Thus, collected flows may be utilized to supplement irrigation of surrounding vegetated areas through active or passive means, reducing demands on local water supplies.

III. Additional Filter Cell Modules

The structures and methods of present invention is not limited to use with tree boxes and can be used in various configurations with other bioretention cells containing other plant, mulch, soil, or vegetation material to manage storm water flow and inhibit the flow of pollutants, debris, and other contaminants into drainage systems. The internal high flow bypass chamber keeps peak flows from coming into contact with the bioretention surface area, reducing scour associated with higher flows. A wide range of sizes and modular structures can be configured to meet the specific flow and layout requirements assuring consistent dimensional tolerances and structural integrity of the installed systems.

In addition, the size of the filter cell modules of the present invention may be designed with a number of widths depths to meet desired treatment flow and site layout requirements. Examples of design flow rates, listed as filtered flow rates per lineal foot of filter cell, as listed in the below table. Storage volume is based on a 10-inch ponding layer, 18-inch deep growing medium, and 30-inch gravel underdrain/storage layer.

|  |  |  |  |  |  | Storage Volume | | |
| --- | --- | --- | --- | --- | --- | --- | --- | --- |
| Filter Cell Module | | 100 in/hr | | 5 in/hr | | Ponding | Soil/Rock | Total |
| Width (ID) - ft[1] | Width (ID) - ft | Treated Flow (gpm)[2] | Treated Flow (cfs)[2] | Treated Flow (gpm)[2] | Treated Flow (cfs)[2] | Storage volume (cf/lineal ft)[3] | Storage volume (cf/lineal ft)[3] | Storage volume (cf/lineal ft)[3] |
| 3 | 36 | 3.1 | 0.007 | 0.16 | 0.0003 | 3 | 4.8 | 7.8 |
| 4 | 48 | 4.2 | 0.009 | 0.21 | 0.0005 | 4 | 6.4 | 10.4 |
| 5 | 60 | 5.2 | 0.012 | 0.26 | 0.0006 | 5 | 8 | 13 |
| 6 | 72 | 6.2 | 0.014 | 0.31 | 0.0007 | 6 | 9.6 | 15.6 |
| 7 | 84 | 7.3 | 0.016 | 0.36 | 0.0008 | 7 | 11.2 | 18.2 |
| 8 | 96 | 8.3 | 0.019 | 0.42 | 0.0009 | 8 | 12.8 | 20.8 |

Other configurations are available to maximize treatment and hyrdromod capture volumes and to meet local agency requirements.

A. Curb Inlet Pre-Filter Module

Figure 14:
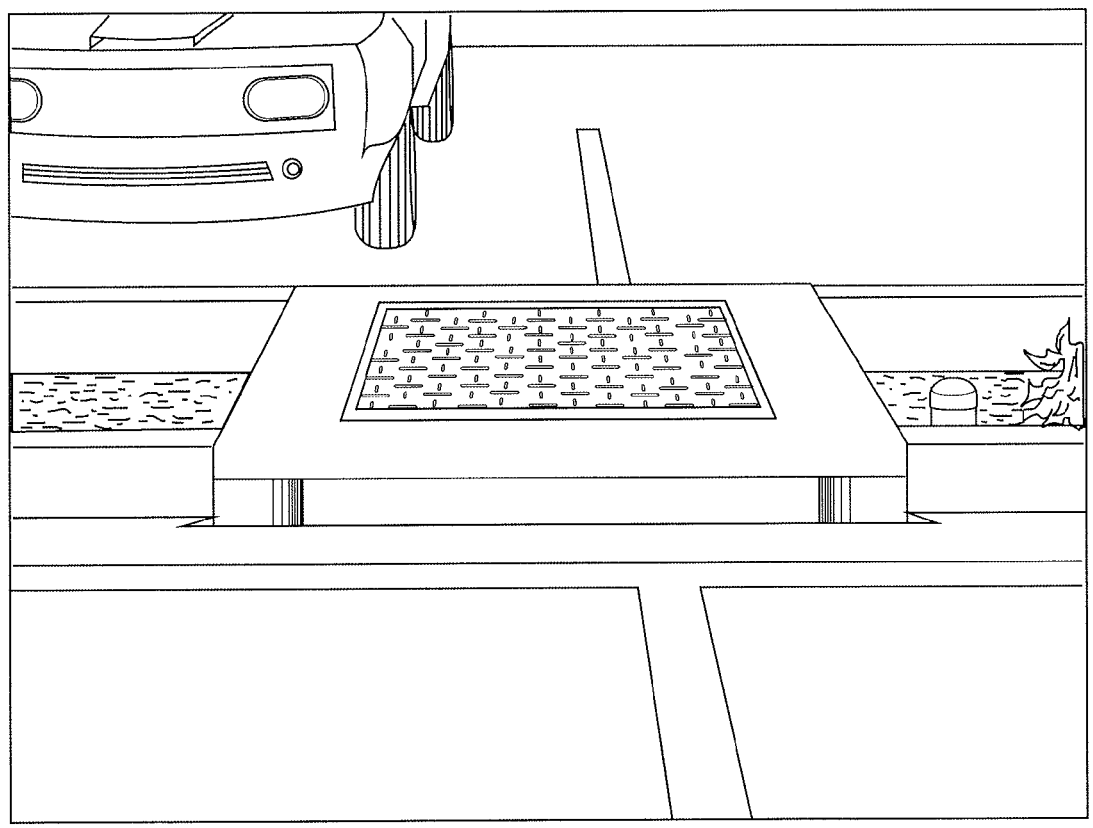
FIG. 14 illustrates schematically an angled top view of another embodiment of the present invention installed at a curb inlet.
Figure 15:
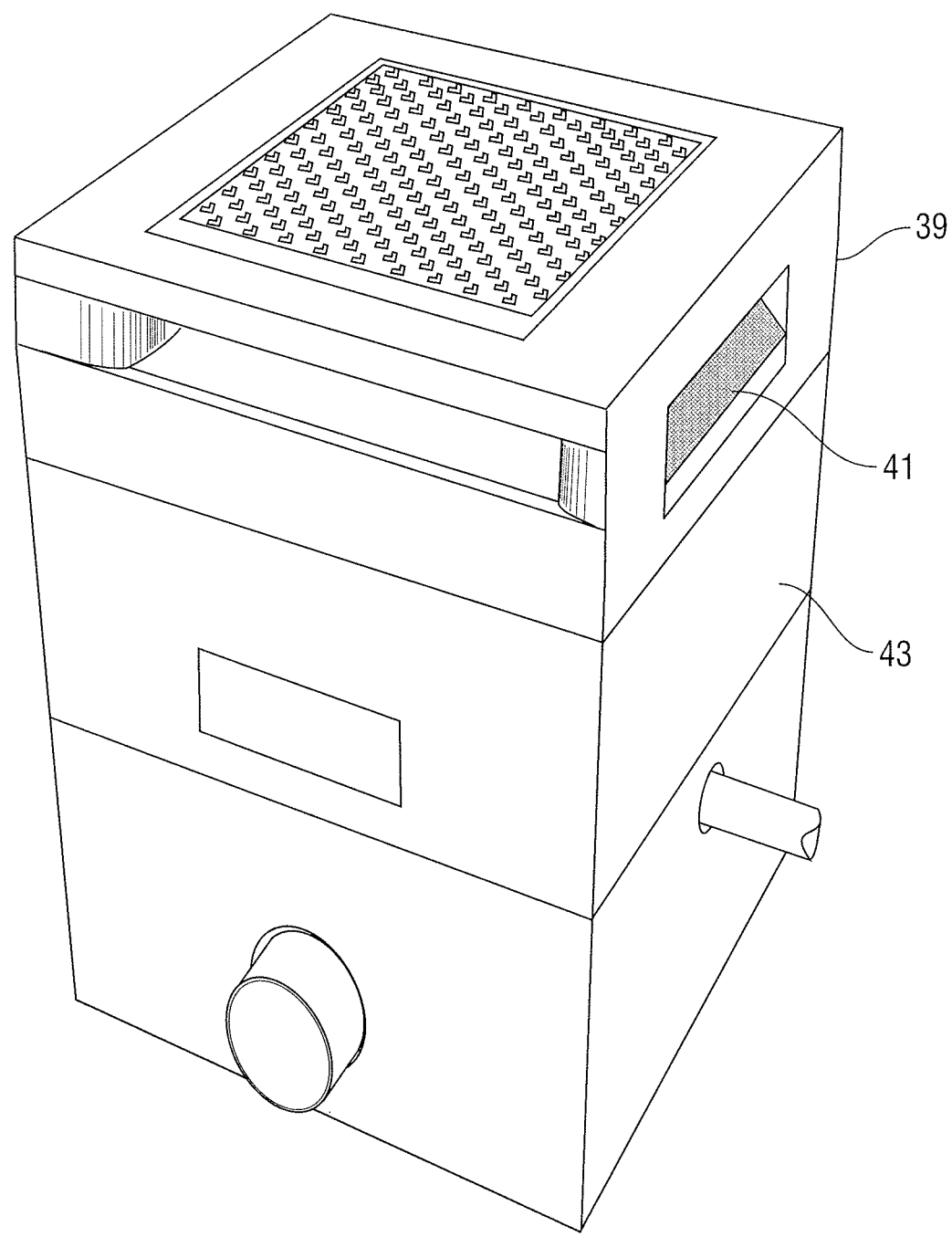
FIG. 15 illustrates an angled side view of a bioretention system of the present invention with a curb inlet prefilter module and internal bypass assembly, used in conjunction with a swale.

FIGS. 14 and 15 illustrate another embodiment of the filter cell modules of the present invention that enhances the performance of bioretention cells used for the treatment of storm water runoff by allowing for pre-filtration and bypass flows. The bioretention system also separates gross pollutants from the bioretention cells, such as bioretention swales, and allows for significant trash capture from incoming storm water runoff.

Figure 16:
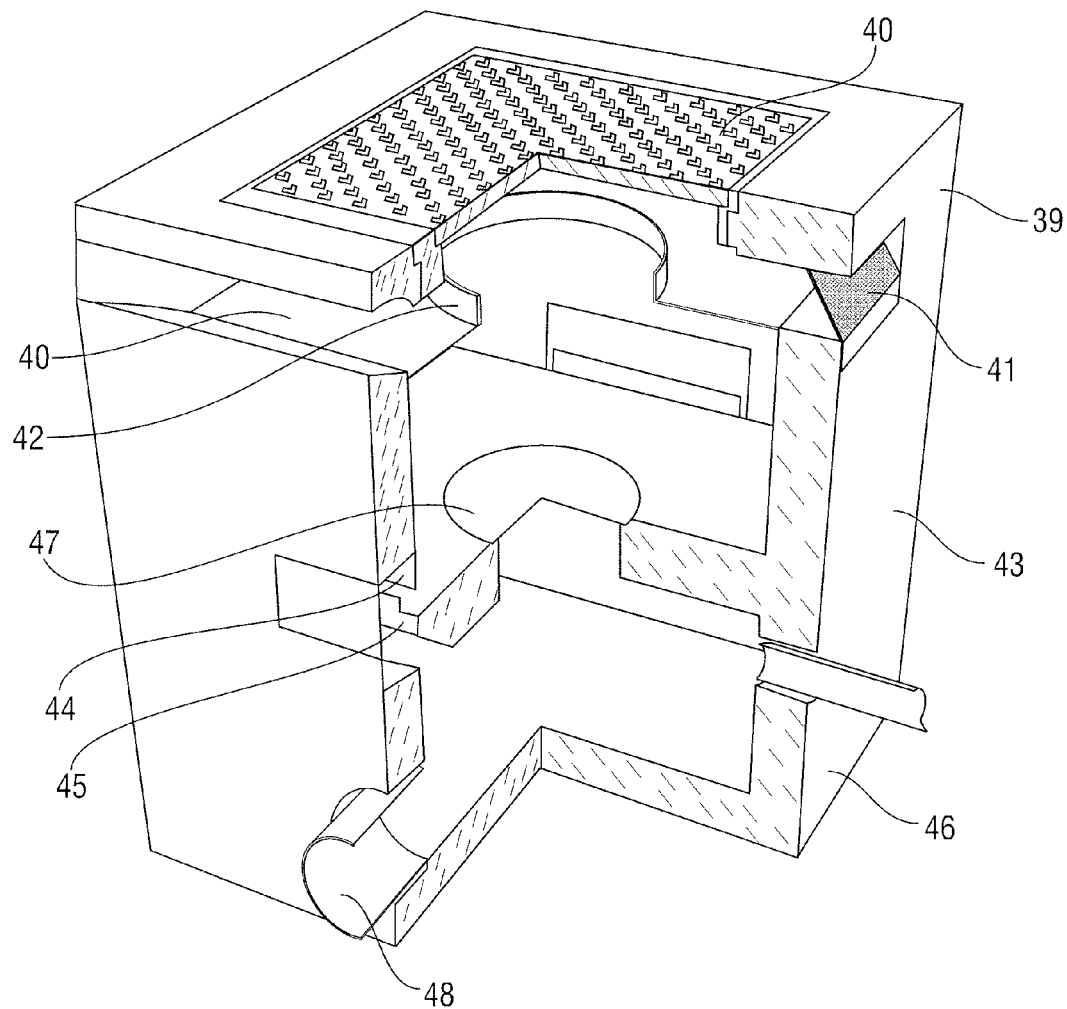
FIG. 16 illustrates schematically a side view of the bioretention system with a curb inlet prefilter module and internal bypass assembly shown in FIG. 15. The corner cutaway illustrates schematically a preferred embodiment of the pre-filter chamber above a bypass module that contains a high flow bypass assembly cast in a side wall of the module.
Figure 17:
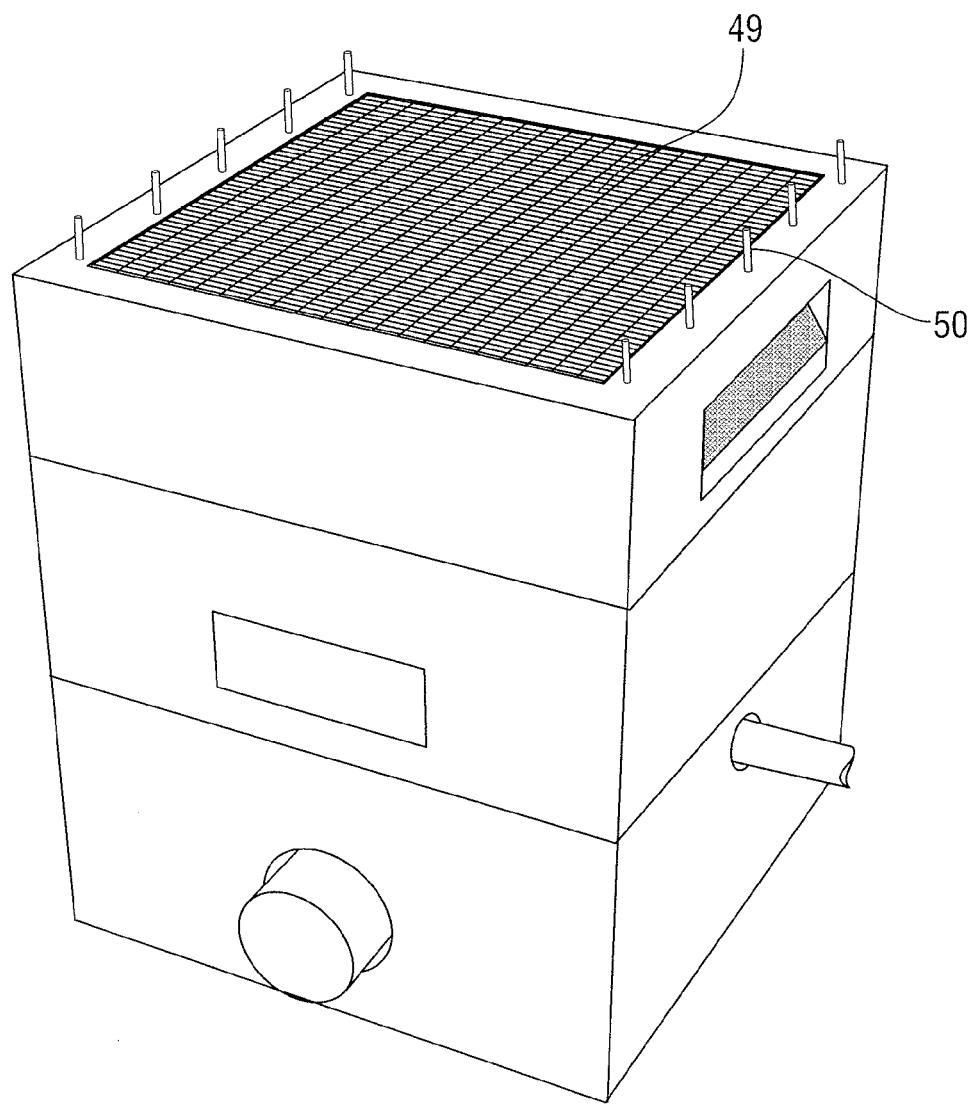
FIG. 17 illustrates schematically an angled side view of a grated inlet prefilter module and internal bypass assembly.

As shown in FIGS. 14 through 16, the bioretention system includes a curb inlet pre-filter chamber or module 39 used with a bioretention cell, such as a grassy swale. The curb inlet pre-filter module directs treatment flows to the bioretention cell surface and incorporates and internal high flow bypass that directs peak flows to an adjacent storm drain piping, enhancing filter performance and reducing surface scour. The pre-filter chamber or module includes an angled filter screen 41 at the curb inlet that retains gross pollutants, such as coarse sediment, trash, floatables, and debris, and keeps the gross pollutants out of the treatment (soil) area. A hinged maintenance and inspection hatch located above the cell allows access to the internal system. The removal of these materials through a pre-filter chamber enhances the treatment area (soil) performance and simplifies maintenance.

The pre-filter chamber also includes a tray 40 with a circular opening and a raised edge or weir 42 around the circumference of opening. The opening of the tray may also be designed to form another shape as understood by those of skill in the art. During periods of normal or low flow, storm water enters the pre-filter chamber or module through the curb inlet opening. Course sediment and debris are separated from the storm water through the angled filter screen. The system then directs the pre-filtered storm water flow toward the surface of the swale. In a preferred embodiment, the system can be hydraulically sized to accommodate the flow capacity of a particular swale.

The bioretention system also includes one or more bypass chambers or overflow modules 43 disposed in the side wall or walls of the system to help evacuate the system during periods of high storm water flow. As shown in FIG. 15, the high flow bypass chamber or overflow module includes a bottom weir 44 and top weir 45, also called over and under weirs. The height of the edge of the tray in the pre-filter chamber is designed to allow for appropriate bypass flow rates. During periods of peak flow, storm water passes over the edge of the tray in the pre-filter chamber and flows down into the high flow bypass chamber. The bottom and top weirs 44 and 45 in the high flow bypass chamber can be positioned at an elevation that is lower than the street level to allow for bypass flow before water passes to the street and to avoid flooding the street. In this preferred embodiment, bypass flows are filtered before release into the overflow module to allow for trash capture before release into storm water drainage systems. Moreover, each bypass module can be designed to allow for certain bypass flow rates. Additional modules can be used to accommodate additional storm water flow.

Storm water is allowed to accumulate to the height of bottom weir, after which it flows downward into a catch basin 46. The trench sections can be supplied with at least a partially open bottom to allow infiltration. The trench sections can also be set on an impervious liner and filled with loosely compacted soil and gravel. Alternatively, the trench sections can have a closed floor that is at least partially impermeable to water flow. The ability to accommodate high flows in a bypass mode helps to prevent scouring of collected pollutants that might otherwise result if the high flows are allowed to directly contact with the swale. As an added feature, the bypass chamber can include a moveable clean out lid 47 that can be lifted to allow for system maintenance. The system can also include one or more junction pipes 48 connected to the catch basin that form a primary outlet for bypass flows. The junction pipes can connect to an underground pipe system, storm drain piping, or other channels for storm water flow. The components of the system may be formed in a single structure or as separate units.

B. Grated Inlet Pre-Filter Module

The storm water filtration components can be used in various other configurations, as is appropriate for a given landscape or site. FIG. 17 and FIGS. 19A through 19E illustrate a system with a grated pre-filter module and an internal bypass assembly. This feature adds filtration capabilities to bio-retention cells that do not have a defined inlet, as may be required for a system such as a curb inlet system that uses the pre-filter chamber. The system includes a grate 49 and may be formed from precast concrete and include slip dowels 50 (e.g., steel dowel rods) to minimize buckling or angular displacement of cold joints between adjoining concrete slabs. The slip dowels may be installed in the concrete slabs using one of various installation techniques known in the art, such as using inserts or sleeves that fit around rebar reinforcement.

The pre-filter module includes a hood 51 over the tray opening. Flows entering toward the center area of the grate are directed to the tray surface. Instead of dropping directly into the center opening of the pre-filter module, the flow is filtered through one or more weirs, 52 and 53, that at least partially obstruct fluid flow. The weirs form a floatables trap for the upper chamber to remove materials, such as debris and gross pollutants. This feature may also be used on the curb inlet version of the present invention, as it also forms a floatables trap (using an under/over weir) for the upper chamber.

Figure 18:
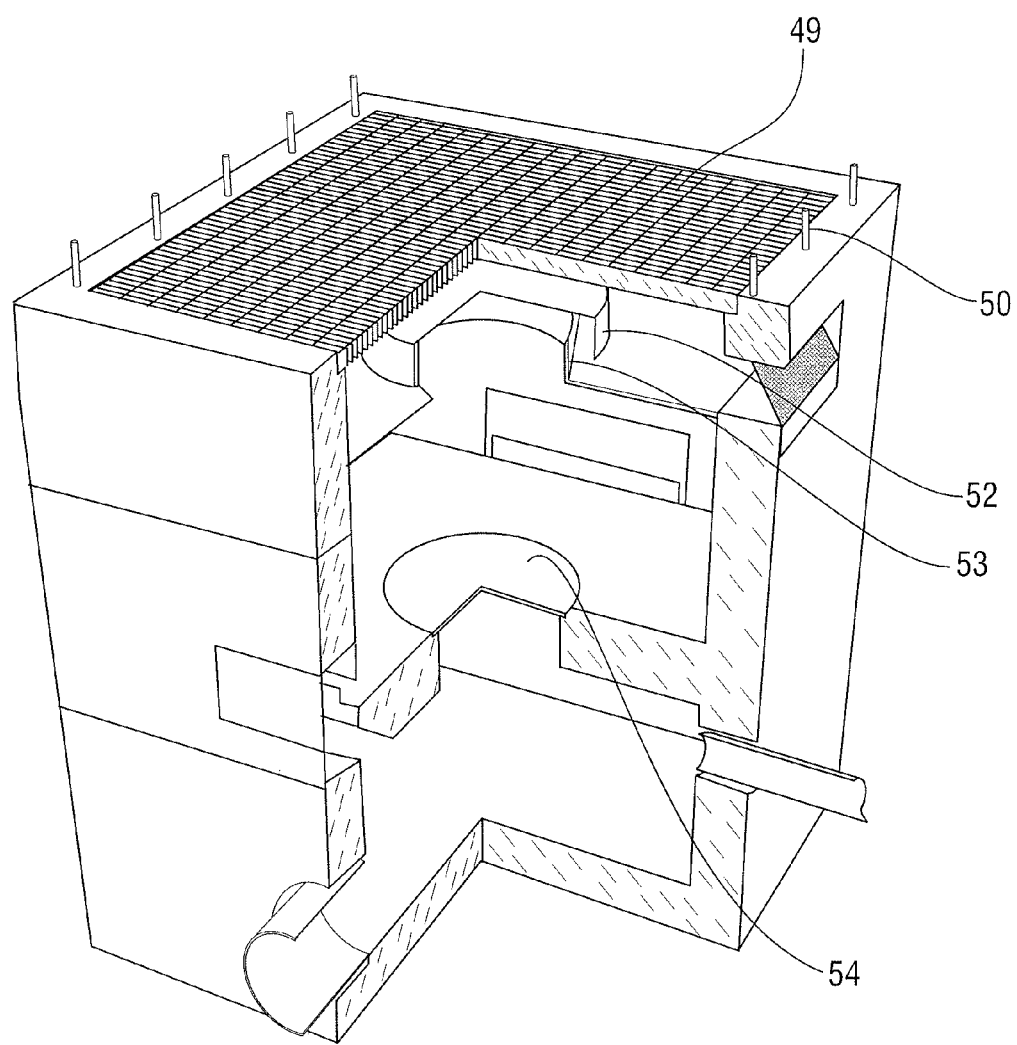
FIG. 18 illustrates schematically a side view of the grated inlet prefilter module and internal bypass assembly shown in FIG. 17. The corner cutaway illustrates schematically a preferred embodiment of the pre-filter chamber above a bypass module that contains a high flow bypass assembly cast in a sidewall of the module.
Figure 19A:
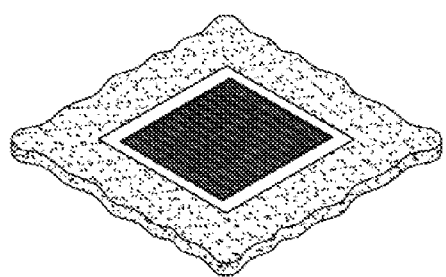
FIGS. 19A through 19E illustrate schematically one embodiment of a grated inlet system with a trash module and internal bypass section of the present invention installed in a paved area.
Figure 19E:
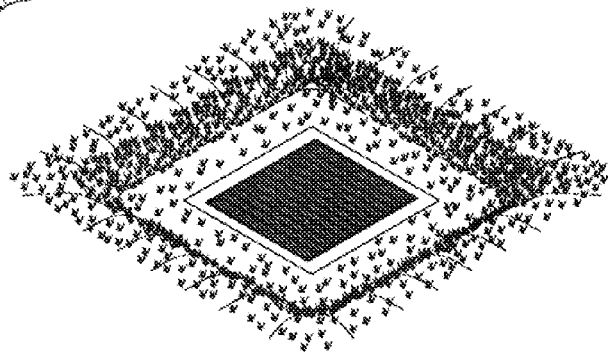
Figure 19B:
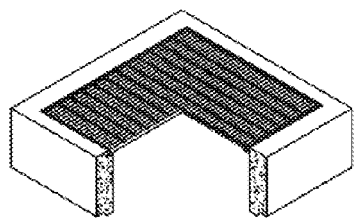
Figure 19C:
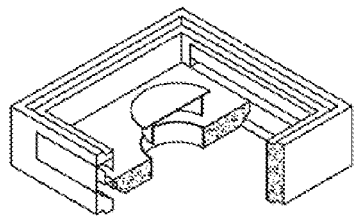
Figure 19D:
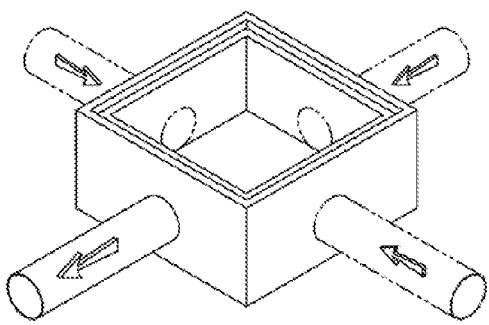

As further shown in FIG. 18, the system can also include a removable cleanout lid 54. In one embodiment, the cleanout lid is a circular plate located along the bottom of the overflow chamber or bypass module. The cleanout lid can be lifted to allow for access to the system and evacuation of standing water between storm events. This can be accomplished by placing openings in the cleanout lid or constructing the cleanout lid so that it forms a false floor in the overflow chamber. The elimination of any standing water is very important as it eliminates concerns regarding vector and bacteria, generation.

C. Trash Modules

In another embodiment, the overflow chamber or bypass modules described in this invention can be used within a typical grated drainage. The trash module can function as a typical surface drain for paved or landscape surfaces to collect and retain floatable pollutants, and it is suitable for use as bioretention cell overflow drain, adding trash capture capabilities to the system.

Figure 20:
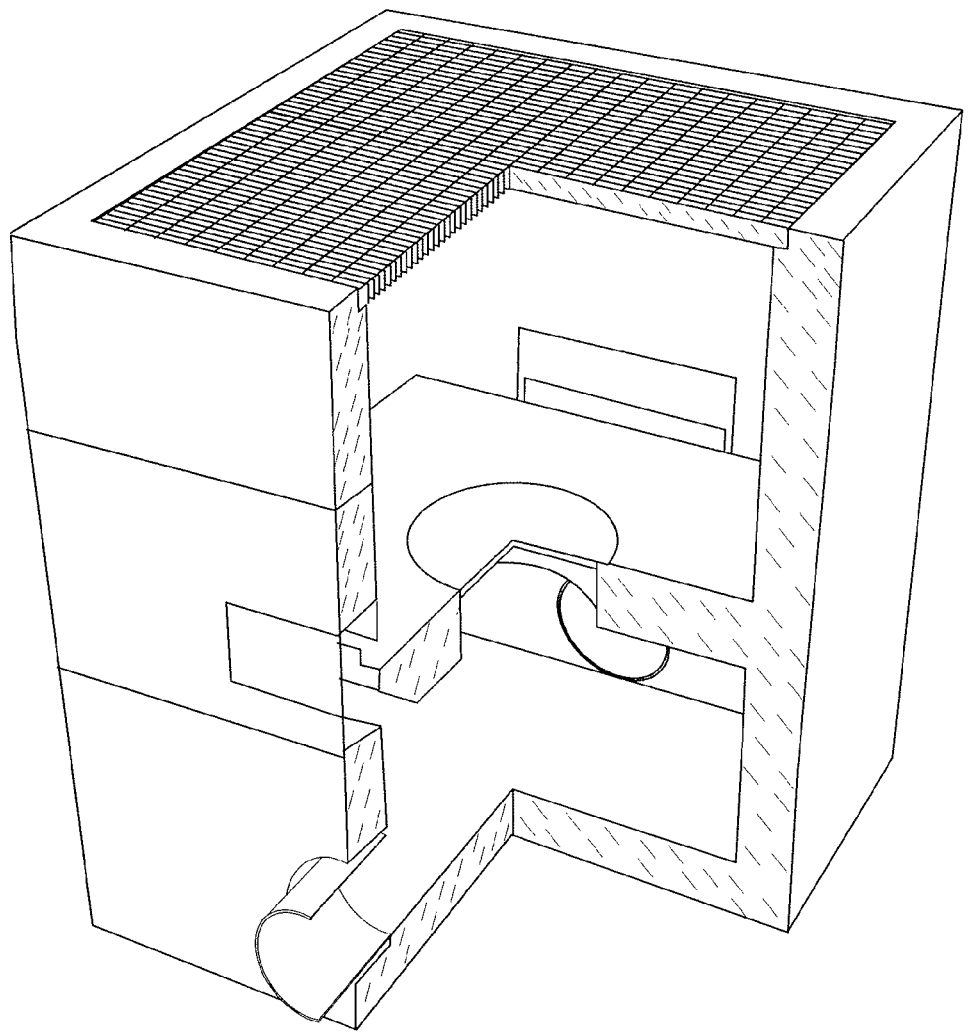
FIG. 20 illustrates schematically one embodiment a side of view of a grated inlet system with a trash module and internal bypass section. The corner cutaway illustrates schematically a preferred embodiment of the bypass module that contains a high flow bypass assembly case in a sidewall of the module.

An exemplary configuration is shown in FIG. 20. In an example, the use of the bypass module in a grated drainage inlet adds trash capture capabilities to a drain inlet used within a parking area. Trash, debris, and other pollutants can be collected and retained within a trash module, without impeding peak flows. Such a device could also be used as an overflow drain within a bio-retention system, eliminating the need for a separate pre-filter chamber. The bypass module and an outlet chamber with an outlet pipe may be integrated with the trash module (as shown in FIGS. 26A and 27A). The outlet, size, type, location, and elevator may be selected based on project requirements. The minimum depth of the outlet chamber is determined by the outlet pipe size. Alternatively, the trash module described in this invention may be used as separate device that could be used in conjunction with all pre-cast or cast-in-place concrete drainage structures. These devices might also be fabricated from alternative materials such as steel, fiberglass or plastic. The trash filter modules with an internal bypass section are shown in FIGS. 26A through 26D and FIGS. 27A through 27D. They may include a grated inlet or curb inlet. The internal bypass sections may include a maintenance or inspection cover to allow access into the module. The system may be constructed from separate components or as a single unit.

C. Trench Filter Cell Modules

The design of the present invention allows for flexibility in storm water management sites. Additional modules can be used in various configurations and sizes to accommodate additional flow rates. In addition, the system can be in conjunction with other pre-cast concrete components, such as trench modules or trench filter cells, overflow modules, light modules, and street tree modules.

Figure 21:
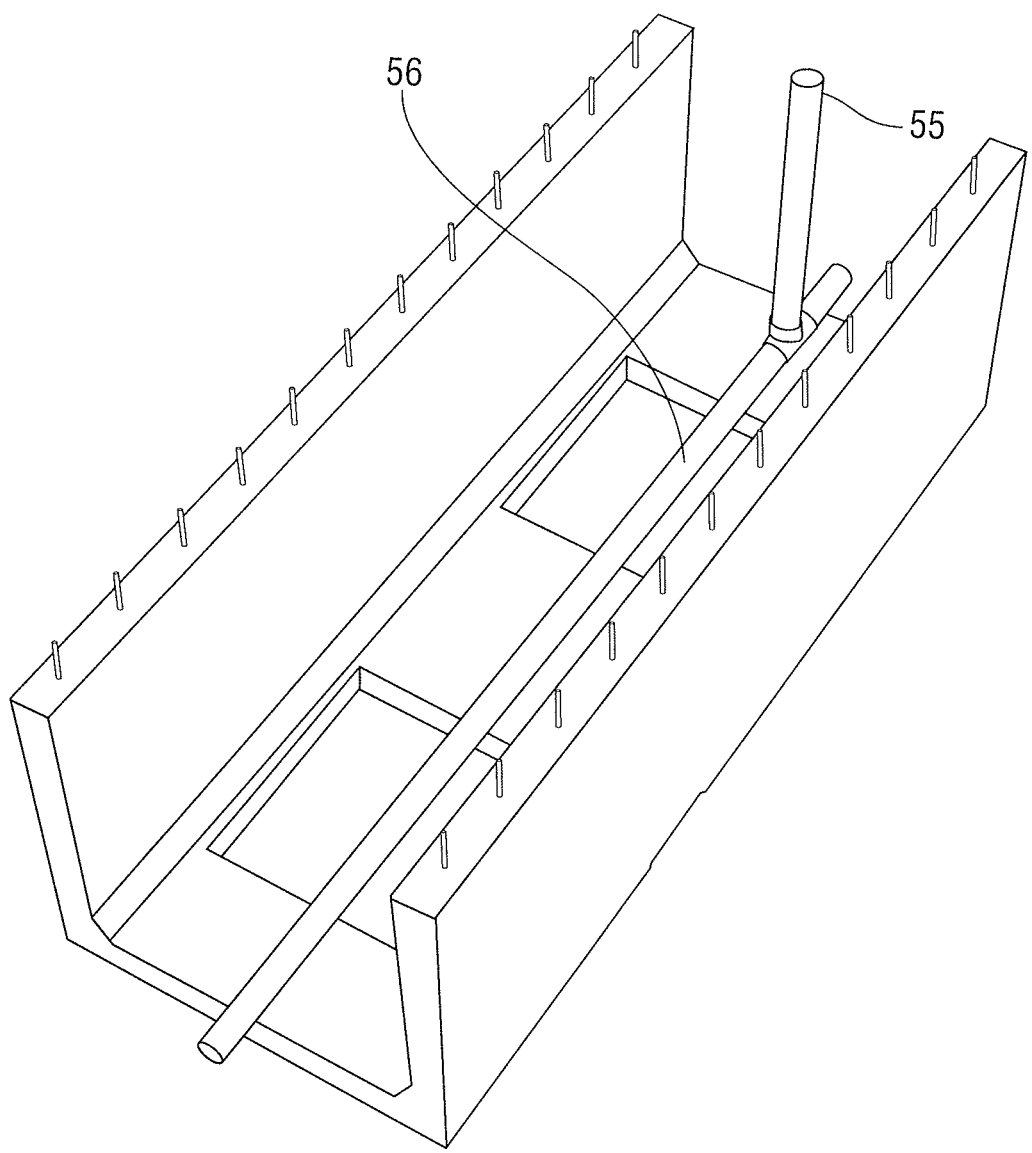
FIG. 21 illustrates schematically an angled side view of a trench module without an end retention system.
Figure 22:
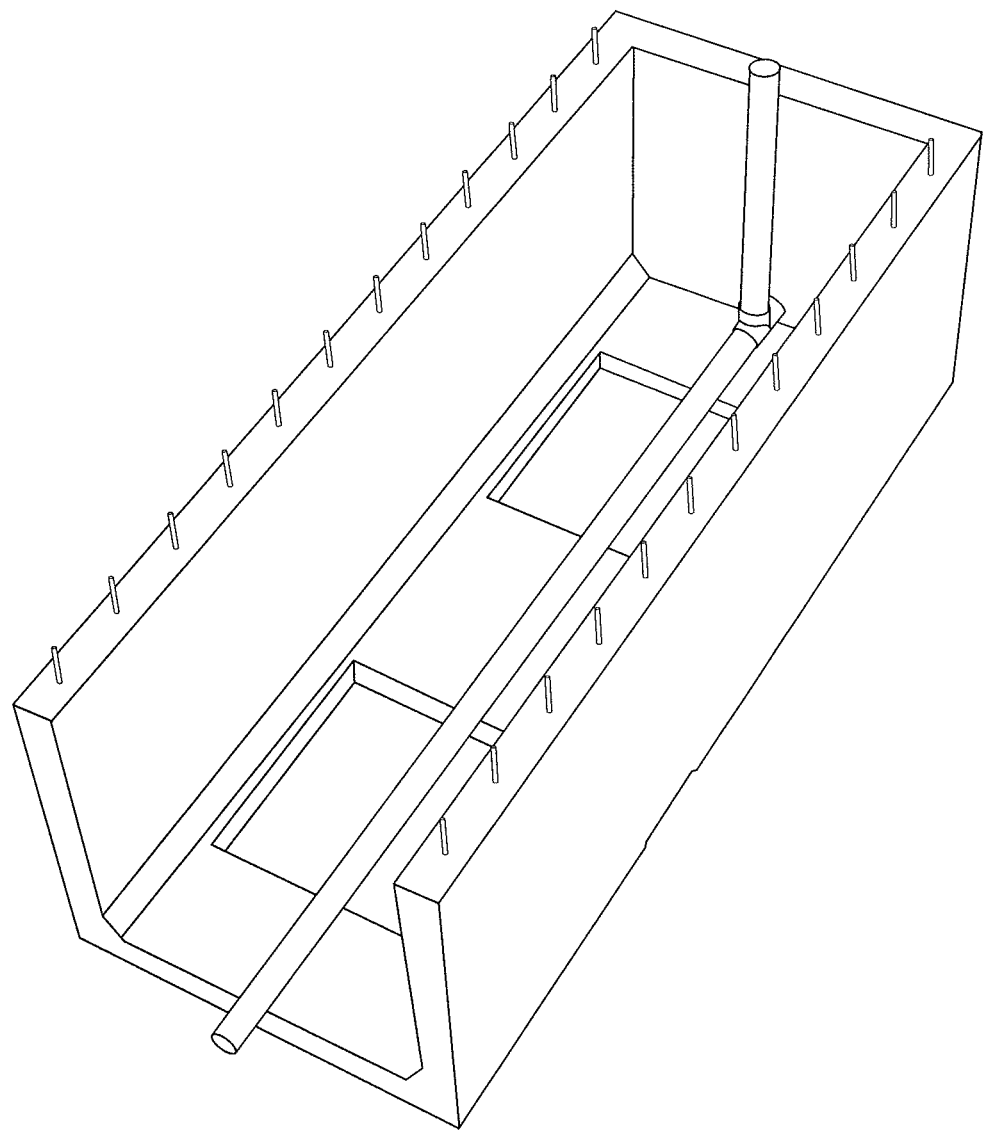
FIG. 22 illustrates schematically an angled side view of a trench module with an end retention system.

Bioretention systems may be used with one or more adjacent trench sections (shown in FIGS. 21 and 22). The trench section serves as a housing or wall for soil, plant, mulch, sand, or other bioretention materials. The trench sections include rebar and rebar dowling inserts, as well as an irrigation sleeve. The trench sections can be supplied with at least a partially open bottom to allow infiltration. The trench sections can also be set on an impervious liner and filled with loosely compacted soil and gravel. Alternatively, the trench sections can have a closed floor that is at least partially impermeable to water flow. A slotted pipe 55 is run horizontally along the bottom of the trench section. A vertical pipe 56 allows for cleanout of the system, including removal of roots and vegetation. The trench sections can include an open end (as shown in FIG. 21) or a closed end retention wall (as shown in FIG. 22), to allow for flexibility in site construction. The modules can be designed in standard or custom lengths to meet filtering and site layout requirements. In addition, standard or custom openings may be specified to accommodate a wide variety of system configurations.

Figure 23:
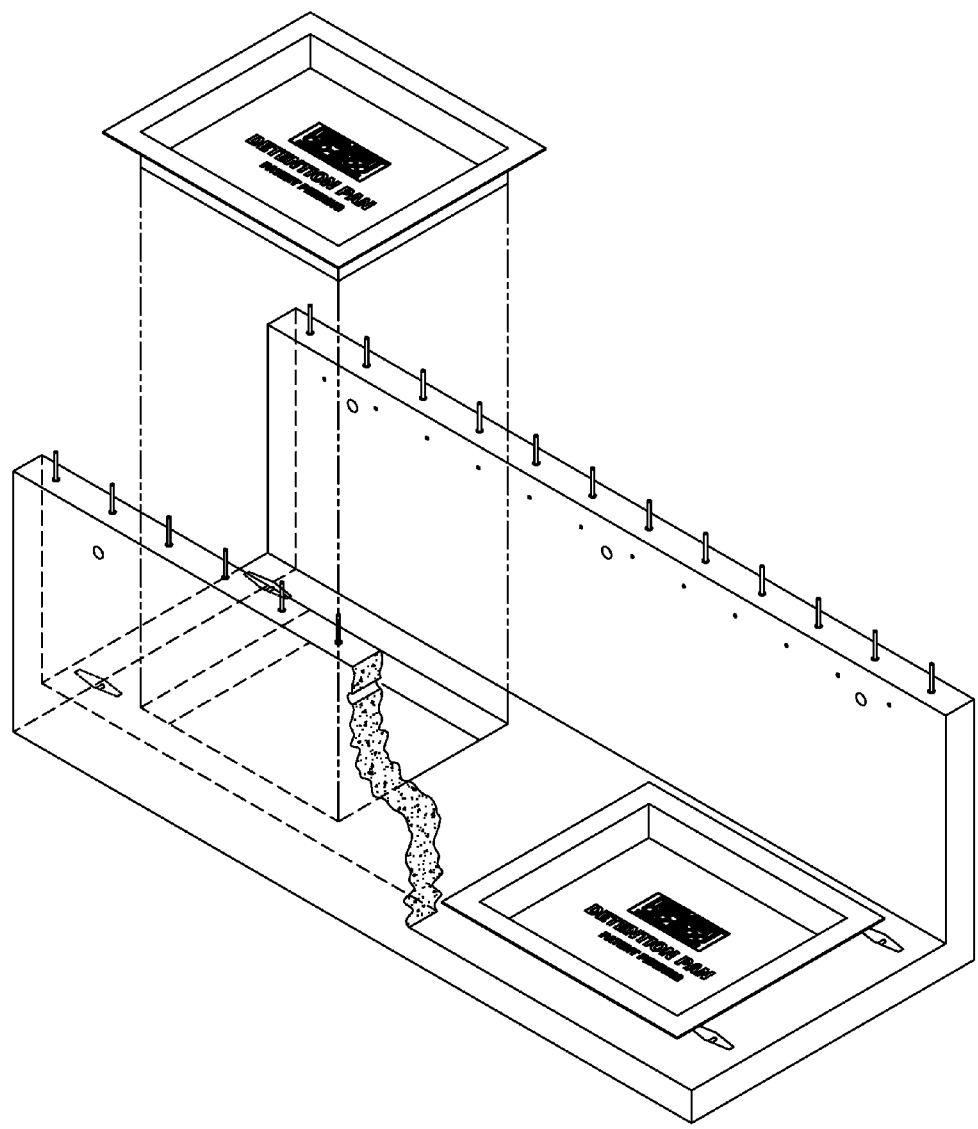
FIG. 23 illustrates schematically top layer view of a bioretention system with module modules according to one embodiment of the invention.

As shown in FIG. 23, plastic pans with wide flanges, also called detention pans, may be fitted into the openings in the trench modules. These pans could be installed either in the factory, or field, and sealed (beneath the flange). These pans could be made either in various sizes or adjustable to fit the various width modules. The detention pans may eliminate the need for producing two variations, open and closed bottom systems. They may create additional rock and water storage capacity. The detention pans may also create anaerobic zones to enhance water quality.

Figure 24:
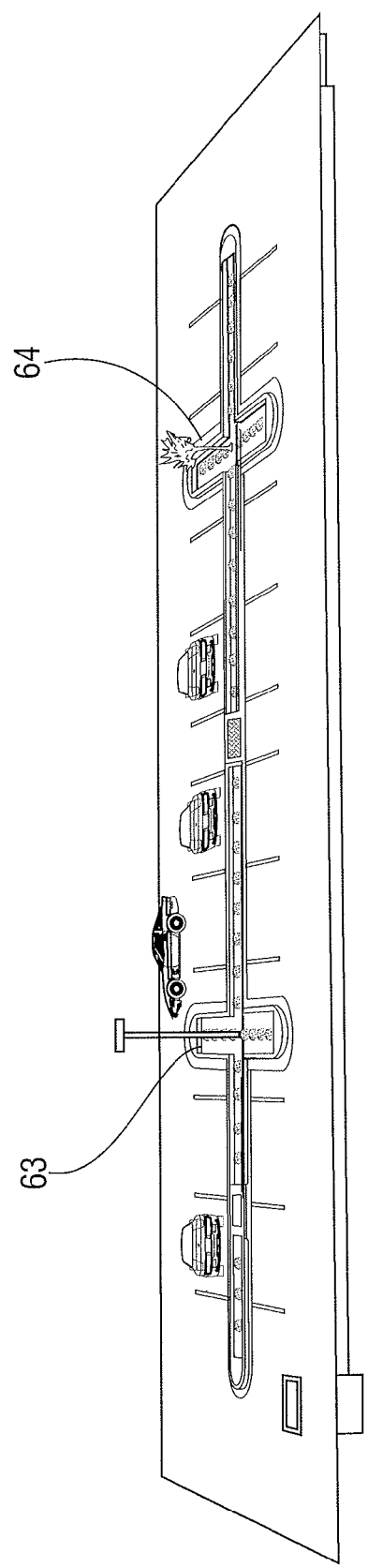
FIG. 24 illustrates schematically a top view of a bioretention system with trench filter cell modules, as installed in a parking lot.
Figure 25:
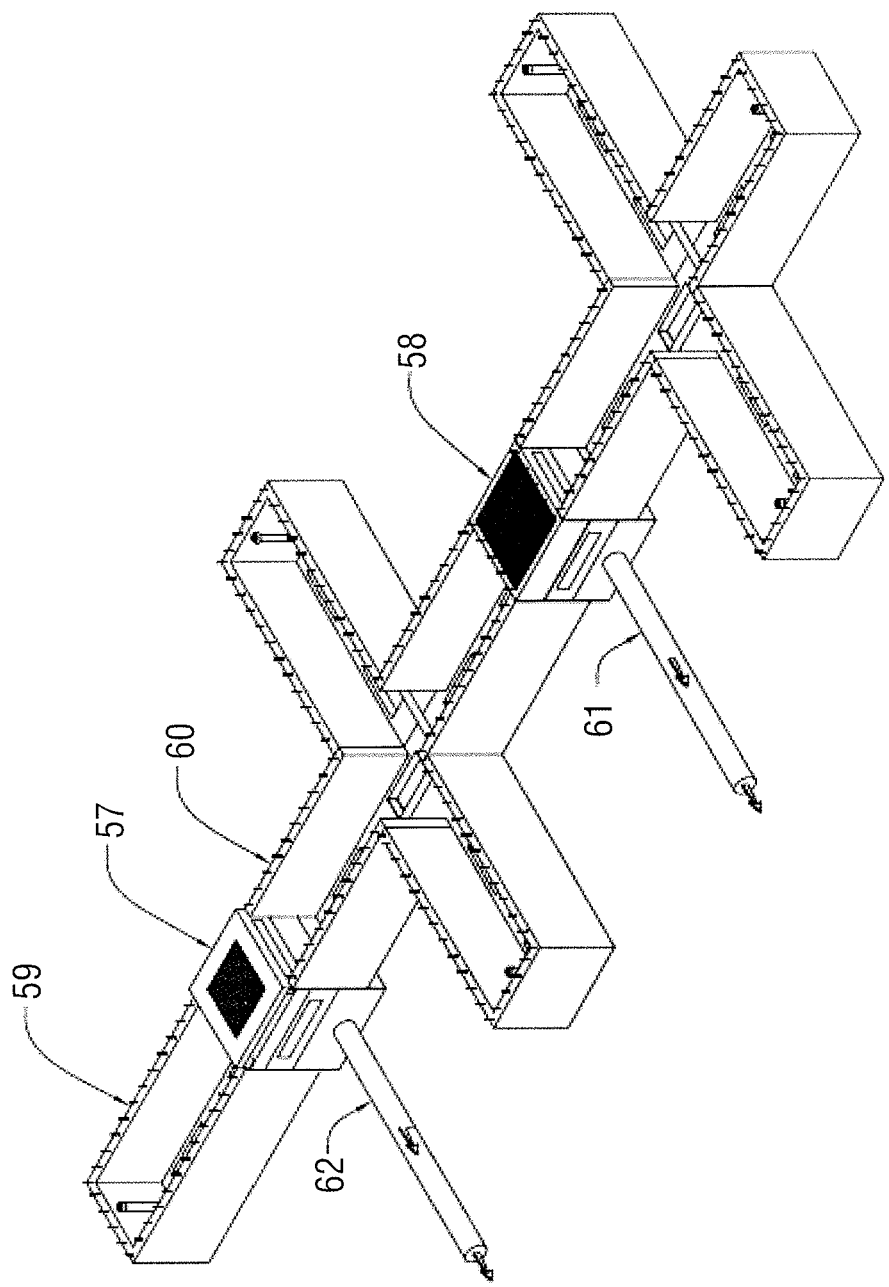
FIG. 25 illustrates schematically an angled top view a bioretention system with trench filter cell modules.
Figure 28A:
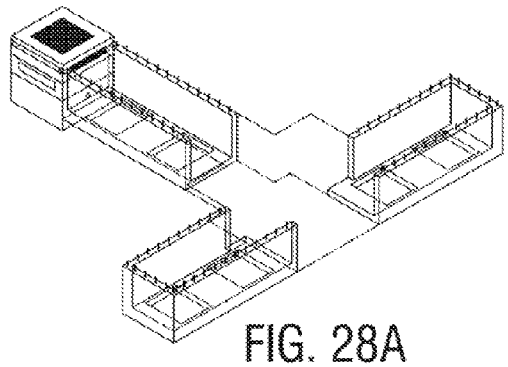
FIGS. 28A through 28F illustrate schematically various configurations of the filter cell modules of the present invention.
Figure 28B:
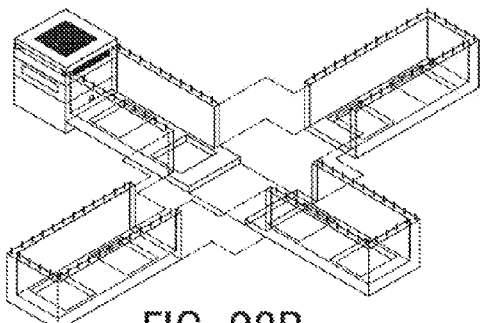
Figure 28C:
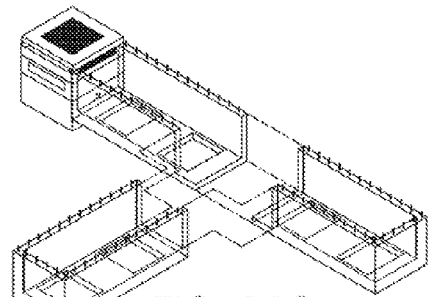
Figure 28D:
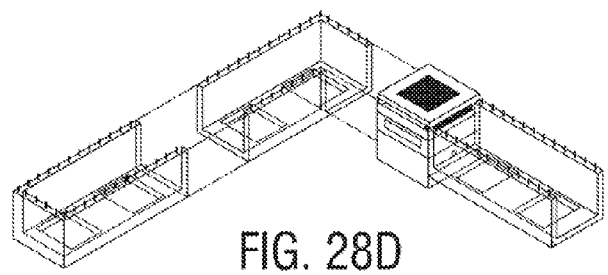
Figure 28E:
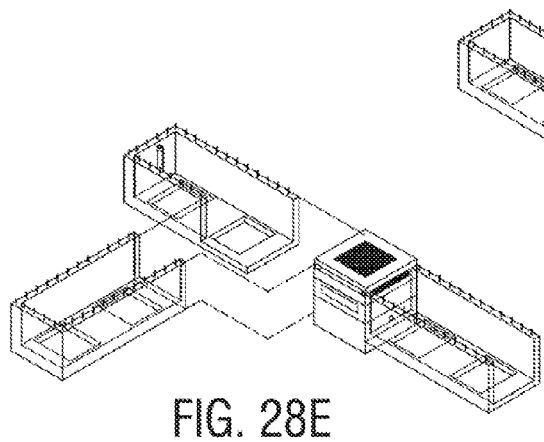
Figure 28F:
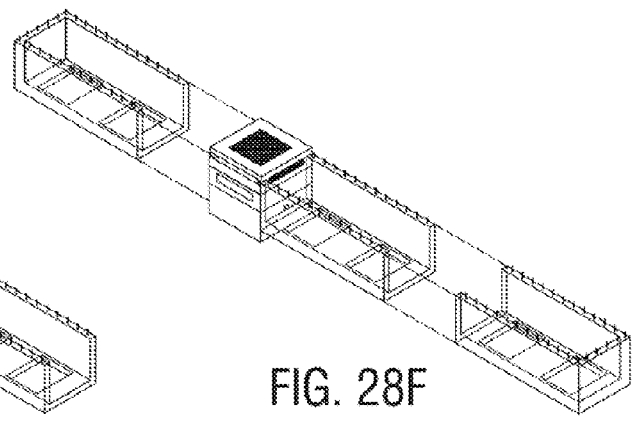

Flows from the filtration modules can be directed through one or more trench sections and are allowed to percolate through the soil or plant material placed in the trench section. The trench sections can be connected in various configurations to increase the overall surface area for storm water treatment. FIGS. 24 and 25 illustrate systems using multiple trench sections adjacent to different bioretention assemblies. It includes one or more curb inlet pre-filter module with internal bypass 57 (as described in the present invention). It also includes one or more grated pre-filter modules 58 (also described above). Bypass flows from the swale and grated systems are directed to trench sections 59, 60 or an underground pipe system for storm water drainage 61, 62. The trench systems may include a street light module 63 or street tree module 64. In a preferred embodiment, the system components can be formed of pre-cast concrete, designed for HS 20 loading. Exposed metal components may be stainless steel (Type 304), aluminum or galvanized mild steel. Trench modules may be used with different filter module types and filter module configurations, as shown in FIGS. 24 through 27. The trench modules may also be used in different configurations, such as "tee" end-cap, "cross," "tee" mid-line, "L-corner," alternative "tee" mid-line, and "linear" configurations, as shown in FIG. 28A through FIG. 28F, respectively.

The above disclosures are sufficient to enable one of ordinary skill in the art to practice the invention, and provide the best mode of practicing the invention presently contemplated by the inventor. While there is provided herein a full and complete disclosure of specific embodiments of this invention, it is not desired to limit the invention to the exact construction, dimensional relationships, and operation shown and described. Various modifications, alternative constructions, design options, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

What is claimed is:

1. An assembly for use in a bioretention system comprising:
   (a) a pre-filter chamber comprising one or more inlet openings, a permeable side wall, a bottom surface, a bottom opening along the bottom surface, and a substantially upright baffle extending around the rim of the bottom opening,
   wherein the baffle is adapted to direct fluid through the permeable side wall and to the surface of an adjacent bioretention cell when fluid accumulates below the height of the baffle, and further wherein the baffle is adapted to direct fluid away from the adjacent bioretention cell and through the bottom opening when fluid accumulates above the height of the baffle;

(b) a bypass chamber disposed below the pre-filter chamber and comprising a top opening in fluid communication with the bottom opening of the pre-filter chamber, a side wall, and a weir module disposed within the side wall; and (c) an outlet chamber disposed below the bypass chamber and comprising an outlet opening and one or more side openings in fluid communication with the weir module.

2. The assembly of claim 1, wherein the pre-filter chamber is adjacent to a bioretention cell comprising at least one of the following: biofiltration media, mulch, and plant.

3. The assembly of claim 1, wherein the permeable side wall comprises an angled filter screen.

4. The assembly of claim 1, wherein the outlet chamber further comprises a side wall, and the weir module is also disposed within the side wall of the outlet chamber.

5. The assembly of claim 1, wherein the weir module comprises top and bottom weirs, and a portion of the top weir is in front of a portion of the bottom weir.

6. The assembly of claim 5, wherein the bottom of the top weir is set at an elevation below the top of the bottom weir.

7. The assembly of claim 1, wherein at least one inlet opening comprises a curb inlet opening along a side of the pre-filter chamber.

8. The assembly of claim 1, wherein at least one inlet opening comprises a top opening, and the pre-filter chamber further comprises a grate disposed above at least one inlet opening.

9. The assembly of claim 1, further comprising a hood above the bottom opening of the pre-filter chamber, the hood comprising a substantially vertical section that at least partially obstructs fluid flow.

10. The assembly of claim 1, wherein the bypass chamber further comprises a floor and a moveable access plate along the floor.

11. The assembly of claim 1, wherein the outlet chamber further comprises an open bottom.

12. The assembly of claim 1, wherein the outlet chamber further comprises a bottom surface impermeable to fluid flow.

13. The assembly of claim 1, wherein the outlet opening is coupled to a storm water storage system.

14. A vault assembly for pre-filtering fluid entering a bioretention system comprising:

(a) an upper compartment comprising one or more inlet openings, a permeable side wall, a bottom opening, and a substantially vertical baffle extending around the rim of the bottom opening;

(b) a middle compartment disposed below the upper compartment, comprising a side wall and a top opening adapted to receive fluid from the upper compartment;

(c) a lower compartment disposed below the middle chamber, comprising a side wall, a side opening adapted to receive fluid from the middle compartment, and an outlet opening; and (d) a weir module integrated within the side walls of the middle and lower compartments.

15. The assembly of claim 14, wherein the baffle of the upper compartment is adapted to direct fluid through the permeable side wall and to the surface of an adjacent bioretention cell when fluid accumulates below the height of the baffle.

16. The assembly of claim 14, wherein the baffle of the upper compartment is adapted to direct fluid through the bottom opening of the upper compartment when fluid accumulates above the height of the baffle.

17. The assembly of claim 14, wherein the upper compartment is adjacent to a bioretention unit comprising at least one of the following: biofiltration media, mulch, and plant.

18. The assembly of claim 14, wherein the permeable side wall comprises an angled filter screen.

19. The assembly of claim 14, wherein the weir module comprises top and bottom weirs, and a portion of the top weir is in front of a portion of the bottom weir.

20. The assembly of claim 19, wherein the bottom of the top weir is set at an elevation below the top of the bottom weir.

21. The assembly of claim 14, wherein at least one inlet opening comprises a curb inlet opening along a side of the upper compartment.

22. The assembly of claim 14, wherein at least one inlet opening comprises a top opening, and the upper compartment further comprises a grate disposed above at least one inlet opening.

23. The assembly of claim 14, further comprising a hood above the bottom opening of the upper compartment, the hood comprising a substantially vertical section that at least partially obstructs fluid flow.

24. The assembly of claim 14, wherein the middle compartment further comprises a floor and a moveable access plate along the floor.

25. The assembly of claim 14, wherein the lower compartment further comprises an open bottom.

26. The assembly of claim 14, wherein the lower compartment further comprises a bottom surface impermeable to fluid flow.

27. The assembly of claim 14, wherein the outlet opening is coupled to a storm water storage system.

28. A method for processing storm water in a bioretention system, comprising the steps of:

(a) receiving storm water at one or more inlet openings in an pre-filter chamber comprising: a permeable side wall, a substantially horizontal bottom surface, a bottom opening along the bottom surface, and a substantially vertical baffle extending around the rim of the bottom opening;

(b) directing filtered storm water through the permeable side wall of the pre-filter chamber to the surface of an adjacent bioretention cell, when the storm water level is below the height of the baffle;

(c) passing storm water through the bottom opening of the pre-filter chamber to a bypass chamber, when the storm water level rises above the height of the baffle;

(d) removing pollutants from storm water in the bypass chamber; and (e) releasing storm water through one or more outlet openings in an outlet chamber.

29. The method of claim 28, wherein the permeable side wall comprises an angled filter screen.

30. The method of claim 28, wherein the step of (b) directing filtered storm water comprises directing storm water to at least one of the following: biofiltration media, mulch, and plant.

31. The method of claim 28, wherein the step of (d) removing pollutants from storm water in the middle chamber comprises:

(i) directing incoming storm water through a bypass module in a side wall of the bypass chamber, said bypass module comprising top and bottom weirs dimensioned to at least partially obstruct fluid flow through the bypass chamber, (ii) retaining pollutants in the bypass chamber, and (iii) passing fluid from the bypass module through one or more side openings in the outlet chamber.

32. The method of claim 31, wherein a portion of the top weir is in front of a portion of the bottom weir.

33. The method of claim 28, wherein at least one inlet opening comprises a curb inlet opening along a side of the pre-filter chamber.

34. The assembly of claim 28, wherein at least one inlet opening comprises a top opening, and the pre-filter chamber further comprises a grate disposed above at least one inlet opening.

35. The method of claim 28, further comprising a hood above the bottom opening of the pre-filter chamber, the hood comprising a substantially vertical section that at least partially obstructs fluid flow.

36. The method of claim 28, wherein the bypass chamber further comprises a floor and a moveable access plate along the floor.

37. The method of claim 28, wherein the outlet chamber further comprises an open bottom.

38. The method of claim 28, wherein the outlet chamber further comprises a bottom surface impermeable to fluid flow.

39. The method of claim 28, wherein the step of (e) releasing storm water through one or more outlet openings further comprises directing storm water to one or more fluid conveying apparatus.

40. The method of claim 28, wherein the outlet opening is coupled to a storm water storage system.

41. The method of claim 28, wherein the storm water released through the one or more outlet openings is directed to a pipe in a trench section along a substantially parallel side of the structure, wherein the trench section comprises at least one of the following: biofiltration media, mulch, and plant.

42. A method for pre-treating storm water in a bioretention system, comprising the steps of:
(a) receiving fluid at one or more inlet openings in a rectangular vault structure comprising an upper compartment, a middle compartment, and a lower compartment, wherein the upper compartment comprises a permeable side wall, a bottom opening, and a substantially vertical baffle extending around the rim of the bottom opening;
(b) providing a first flow route when fluid accumulates below the height of the baffle in the upper chamber, said first flow route comprising the steps of: flowing storm water through the permeable side wall of the upper compartment, and releasing storm water to the surface of an adjacent bioretention cell;
(c) providing a second flow route when fluid accumulates above the height of the baffle in the upper compartment, said second flow route comprising the steps of: flowing storm water through the bottom opening of the upper compartment to the middle compartment, removing pollutants from storm water in the middle compartment, and releasing storm water through one or more outlet openings in the lower compartment.

43. The method of claim 42, wherein the permeable side wall of the upper compartment comprises an angled filter screen.

44. The method of claim 42, wherein the first flow route further comprises flowing storm water through at least one of the following: biofiltration media, mulch, and plant.

45. The method of claim 42, wherein the step of removing pollutants from storm water in the middle compartment comprises:
(i) directing incoming storm water through a bypass module integrated within a side wall of the middle compartment, wherein the bypass module comprises top and bottom weirs dimensioned to at least partially obstruct flow through the middle compartment,
(ii) retaining pollutants in the middle compartment, and
(iii) passing fluid from the bypass module through one or more side openings in the lower compartment.

46. The method of claim 45, wherein a portion of the top weir is in front of a portion of the bottom weir.

47. The method of claim 45, wherein the weir module is also disposed within a side wall of the lower compartment.

48. The method of claim 42, wherein at least one inlet opening comprises a curb inlet opening along a side of the upper compartment.

49. The method of claim 42, wherein at least one inlet opening comprises a top opening, and the upper chamber further comprises a grate disposed above at least one inlet opening.

50. The method of claim 42, further comprising a hood disposed over the bottom opening of the upper compartment, the hood comprising a substantially vertical section that at least partially obstructs fluid flow.

51. The method of claim 42, wherein the middle compartment further comprises a floor and a moveable access plate along the floor.

52. The method of claim 42, wherein the lower compartment further comprises an open bottom.

53. The method of claim 42, wherein the lower compartment further comprises a bottom surface impermeable to fluid flow.

54. The method of claim 42, wherein the step of releasing storm water through one or more outlet openings further comprises directing storm water to one or more fluid conveying apparatus.

55. The method of claim 42, wherein the outlet opening is coupled to a storm water storage system.

* * * * *